(12) United States Patent
Barnard et al.

(10) Patent No.: US 9,016,658 B2
(45) Date of Patent: Apr. 28, 2015

(54) ELECTRONIC DEVICE HOLDER

(71) Applicant: Aspire Innovation, LLC, Evansville, IN (US)

(72) Inventors: Brandon Barnard, Evansville, IN (US); Karl Fritze, Hastings, MN (US)

( * ) Notice: Subject to any disclaimer, the term of this patent is extended or adjusted under 35 U.S.C. 154(b) by 0 days.

(21) Appl. No.: 14/101,542

(22) Filed: Dec. 10, 2013

(65) Prior Publication Data

US 2014/0224947 A1 Aug. 14, 2014

Related U.S. Application Data

(63) Continuation of application No. 13/303,681, filed on Nov. 23, 2011, now abandoned.

(60) Provisional application No. 61/460,700, filed on Jan. 6, 2011.

(51) Int. Cl.
| | | |
|---|---|---|
| *F16M 11/00* | (2006.01) | |
| *F16M 11/14* | (2006.01) | |
| *F16M 11/04* | (2006.01) | |
| *F16M 11/40* | (2006.01) | |
| *F16B 47/00* | (2006.01) | |
| *H01F 7/02* | (2006.01) | |

(52) U.S. Cl.
CPC .............. *F16M 11/14* (2013.01); *F16M 11/041* (2013.01); *F16M 11/40* (2013.01); *F16B 47/00* (2013.01); *H01F 7/0252* (2013.01); *F16M 2200/022* (2013.01)

(58) Field of Classification Search
CPC . F16M 11/14; F16M 11/041; F16M 11/2078; F16M 13/00; F16M 11/04; F16M 13/022; B60R 2011/0071; B60R 2011/0089; B60R 11/00; B60R 11/0241; B60R 11/0252; G03B 17/56

See application file for complete search history.

(56) References Cited

U.S. PATENT DOCUMENTS

| | | | | |
|---|---|---|---|---|
| 3,392,950 | A  * | 7/1968  | Pierce     | 248/279.1 |
| 3,428,286 | A  * | 2/1969  | Del Pesco  | 248/474 |
| D411,544  | S  * | 6/1999  | Richter    | D14/253 |
| D415,771  | S  * | 10/1999 | Richter    | D14/253 |
| 6,579,017 | B2 * | 6/2003  | Wei        | 396/428 |
| D521,990  | S  * | 5/2006  | Richter    | D14/253 |
| D522,843  | S  * | 6/2006  | Richter    | D8/363 |
| D533,053  | S  * | 12/2006 | Brassard   | D8/373 |
| D533,055  | S  * | 12/2006 | Brassard   | D8/373 |
| 7,226,026 | B2 * | 6/2007  | Lin        | 248/205.5 |
| D549,709  | S  * | 8/2007  | Richter    | D14/447 |
| D554,042  | S  * | 10/2007 | Richter    | D12/415 |
| 7,290,740 | B2 * | 11/2007 | Joy et al. | 248/187.1 |
| 7,320,450 | B2 * | 1/2008  | Carnevali  | 248/160 |
| 7,500,646 | B2 * | 3/2009  | Chapman    | 248/279.1 |

(Continued)

OTHER PUBLICATIONS

International Search Report and Written Opinion mailed Jul. 30, 2012.

*Primary Examiner* — Bradley Duckworth
(74) *Attorney, Agent, or Firm* — Gary K. Price

(57) ABSTRACT

A holder for an electronic device includes a head with elastically flexible portions configured to removably receive the electronic device with a snap-fit interlock, a neck for supporting the head relative to a surface, and a ball and socket connector coupling the neck to the head, the ball and socket connector configured to allow adjustment of the yaw, the pitch, and the roll of the electronic device with respect to the neck when the electronic device is coupled to the head.

10 Claims, 33 Drawing Sheets

(56) References Cited

U.S. PATENT DOCUMENTS

| | | | |
|---|---|---|---|
| 7,661,648 B2 * | 2/2010 | Lin | 248/683 |
| 7,753,330 B2 * | 7/2010 | Brief | 248/278.1 |
| 7,850,133 B2 * | 12/2010 | Carnevali | 248/205.5 |
| 7,891,615 B2 * | 2/2011 | Bevirt | 248/181.1 |
| 7,984,886 B2 * | 7/2011 | Lin | 248/181.1 |
| D658,651 S * | 5/2012 | Lee et al. | D14/452 |
| 2004/0232291 A1 * | 11/2004 | Carnevali | 248/206.5 |
| 2005/0092873 A1 | 5/2005 | Lin | |
| 2005/0205724 A1 * | 9/2005 | Carnevali | 248/122.1 |
| 2007/0018064 A1 | 1/2007 | Wang | |
| 2007/0040080 A1 * | 2/2007 | Carnevali | 248/205.1 |
| 2007/0278361 A1 * | 12/2007 | May et al. | 248/126 |
| 2008/035802 A1 | 2/2008 | Kim | |
| 2008/0061197 A1 * | 3/2008 | Carnevali | 248/181.1 |
| 2008/0093516 A1 * | 4/2008 | Bevirt | 248/181.1 |
| 2008/0142675 A1 * | 6/2008 | Lu et al. | 248/676 |
| 2008/0217826 A1 | 9/2008 | Kim | |
| 2010/0237206 A1 * | 9/2010 | Barker | 248/206.5 |
| 2013/0068915 A1 | 3/2013 | Yang | |

\* cited by examiner

ELECTRONIC DEVICE HOLDER

CROSS REFERENCE TO RELATED APPLICATION

This application is a continuation of U.S. application Ser. No. 13/303,681, filed Nov. 23, 2011, which claims the benefit of U.S. Provisional Patent Application No. 61/460,700, filed Jan. 5, 2011, which applications are hereby incorporated by reference in their entirety.

TECHNICAL FIELD

The present disclosure relates to a holder or a stand for use with electronic devices including but not limited to tablet personal computers (e.g., an iPad® or an iPad2®), e-book readers (e.g., a Nook™), smart phones (e.g., an iPhone®), cellular phones, GPS units, touch screen devices, digital display devices, electronic notebooks, and the like.

BACKGROUND

When using an electronic device such as a tablet personal computer (also referred to herein simply as a "tablet", a user is normally required to hold the tablet in his or her hands which can pose problems if the user is engaging in another contemporaneous activity, such as playing a musical instrument, where his or her hands are required or if the user does not wish to hold the tablet the entire time that he or she is working on the tablet. The user may then be required to place the tablet on a table, countertop, or another location which may not be suitable for the activity for which he or she is using the tablet. Thus, there is a need in the art for a hands-free holder or stand for an electronic device such as a tablet that includes rapid and easy engagement and removal.

Furthermore, what might be desired in the art is a hands-free stand/holder for electronic devices such as tablets that allow for full 360-degree rotation of the electronic devices for not only landscape and portrait viewing but also for a wide range of swivel and tilt in all directions (e.g., positioning at least about 3-axes such as yaw, pitch, and roll) to a preferred inclination and orientation.

Most modern electronic devices now alter their displayed image orientation by the rapid change from physical landscape to portrait orientation simply by rotating the electronic device 90 degrees to the new preferred orientation. These newer electronic devices sense their attitude using an internal sensor such as an accelerometer. These accelerometers can have as many as 3-axes and can be electronically monitored by the computer and converted to data for use with their software. The software can then determine finger gestures or rotational accelerations which the user creates to change the orientation of the image on the electronic device. For example, the display can quickly change from portrait to landscape left with a 90-degree counterclockwise rotation of the device.

Because of this rapid and frequent need to change the orientation from landscape to portrait, or vice versa, it might also be desirable, in addition to providing a wide-range of swivel and tilt in all directions (e.g., positioning at least about 3-axes such as yaw, pitch, and roll), to allow ease and speed of motion in only the roll axis without disturbing already set preferred yaw and pitch axes.

SUMMARY

According to one example embodiment, the present disclosure relates to a hands-free holder/stand for use with an electronic device such as a tablet, the holder including a base, a neck, a ball and socket connector, and a head.

According to another example embodiment, the neck portion of the holder may include a rigid portion, a crimp portion, a flexible portion, and a threaded stud portion that is configured to be fastened to the ball and socket connector.

According to another example embodiment, the head of the holder is mechanically coupled to the electronic device. According to one embodiment, the head of the holder is directly coupled to the electronic device such as with flexible portions that elastically deform to snap-fit the head to the electronic device. According to another embodiment, the head is coupled to a converter structure that is separately coupled to the electronic device. As such, according to certain example embodiments, the converter structure may be coupled to the electronic device via adhesives and the head of the holder may be coupled to the converter structure with latches, cams, threads, or magnets.

According to another example embodiment, the holder for an electronic device includes a head with elastically flexible portions configured to removably receive the electronic device with a snap-fit interlock, a neck for supporting the head relative to a surface, and an attitude adjustment mechanism such as a hinge, a pivot, a swivel, or a ball and socket connector coupling the neck to the head, the attitude adjustment mechanism configured to allow adjustment of the yaw, the pitch, and the roll of the electronic device with respect to the neck when the electronic device is coupled to the head.

According to another example embodiment, the holder for an electronic device includes a head configured to removably receive the electronic device, a neck for supporting the head relative to a surface, a ball and socket connector coupling the neck to the head, the ball and socket connector configured to allow adjustment of the yaw, the pitch, and the roll of the electronic device relative to the neck when the electronic device is coupled to the head, and a rotary joint that allows further independent adjustment of the roll of the electronic device without disturbing the yaw and the pitch of the electronic device after the yaw, the pitch, and the roll of the electronic device have been initially adjusted and locked using the ball and socket connector.

According to another example embodiment, the present disclosure relates to a holder system for an electronic device that includes a converter that is configured to be attached to the electronic device and a head that is configured to be attached to the converter with mechanical couplings such as for example with cams, latches, threads, or magnets, wherein the head includes at least one movable portion that is configured for detaching the head from the converter.

DETAILED DESCRIPTION

Figure 1:
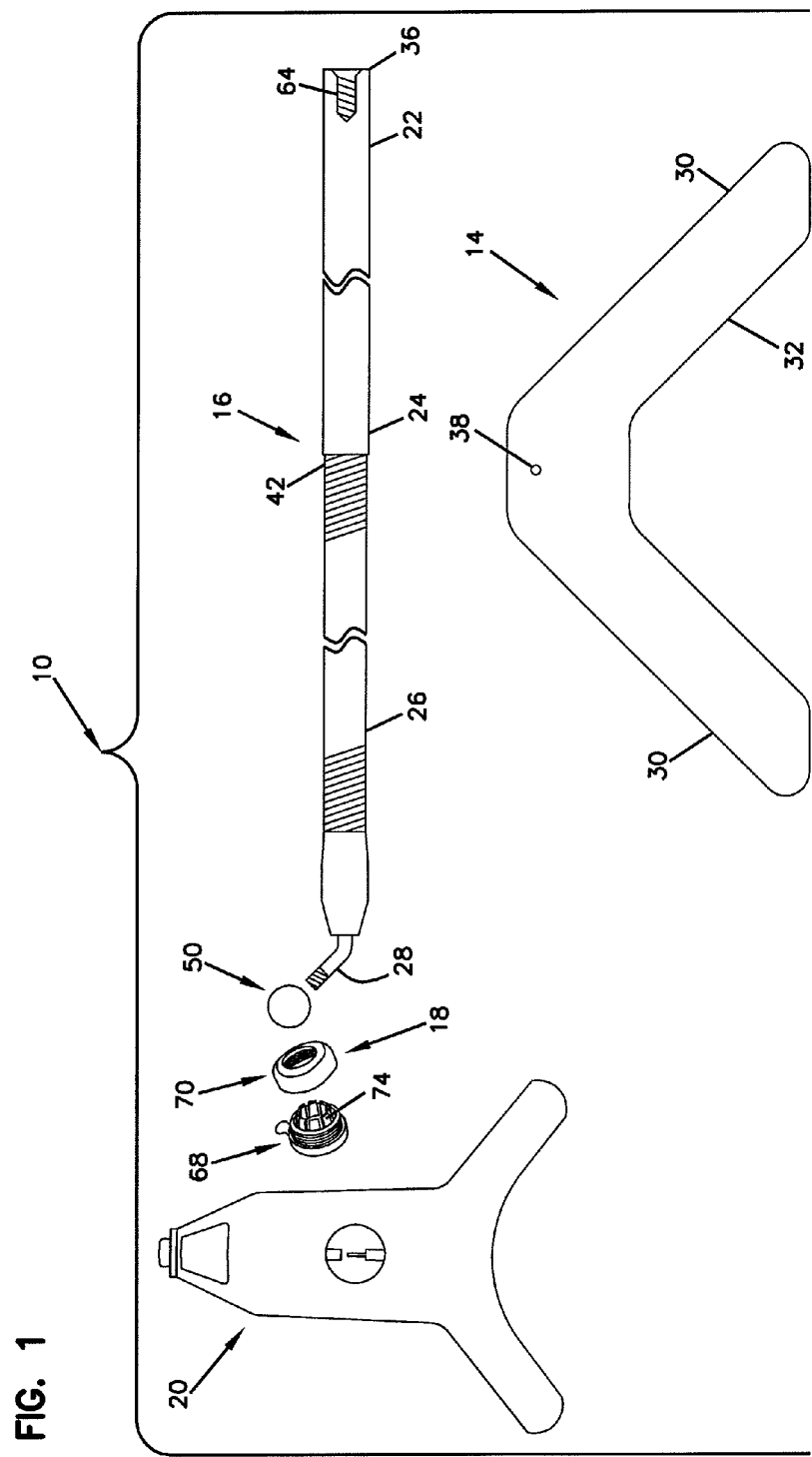
FIG. 1 illustrates an exploded view of a first embodiment of a holder having features that are examples of inventive aspects in accordance with the present disclosure.

Referring now to FIGS. 1-9, a first embodiment of a holder 10 having features that are examples of inventive aspects in accordance with the present disclosure is illustrated. The holder 10 is configured for use with a variety of electronic devices including but not limited to tablet personal computers (e.g., an iPad® or an iPad2®), e-book readers (e.g., a Nook™), smart phones (e.g., an iPhone®), cellular phones, GPS units, touch screen devices, digital display devices, electronic notebooks, and the like. The different embodiments of the holders of the present disclosure will be described and shown as being used with an electronic device in the form of a tablet personal computer 12 (also referred to herein simply as a "tablet"). It will be understood that a tablet 12 is simply one example of an electronic device for which the holders of the present disclosure can be configured for and on which the holders of the present disclosure can be used. A tablet 12 will be used as a non-limiting example device for the purpose of illustrating the inventive features of the different embodiments of the holders of the present disclosure, without affecting the scope of the inventive features, unless specified otherwise.

Still referring to FIGS. 1-9, the holder 10 generally includes a base 14, a neck 16, a ball and socket connector 18, and a head 20. In the depicted example embodiment, the neck 16 includes a rigid portion 22, a crimp portion 24, a flexible portion 26, and a threaded stud portion 28. The rigid portion 22 is configured to be attached to the base 14 of the holder 10. The crimp portion 24 is configured to couple the flexible portion 26 of the neck 16 to the rigid portion 22 of the neck 16. The threaded stud portion 28 is attached to an end of the flexible portion 26.

As will be described in further detail below, the base 14 of the depicted embodiment includes an essentially flat platform that includes lateral extensions 30 that create a V-shaped structure 32. According to certain embodiments, the base 14 may be manufactured of metal and may include surface texturing, giving the base 14 a rough feel.

As will be described in further detail below, the rigid portion 22 of the neck 16 includes a distal end 34 and a proximal end 36. At its proximal end 36, the rigid portion 22 is configured to be attached to the base 14 at the apex 38 of the V-shaped platform 32. The rigid portion 22 may be manufactured of a metal pipe having, according to certain embodiments, a diameter of about 19 millimeters and a length of about 300 millimeters.

The flexible portion 26 of the neck 16 also includes a distal end 40 and a proximal end 42. The flexible portion 26 is attached at its proximal end 42 to the rigid portion 22 via the crimp portion 24 of the neck 14. According to certain embodiments, the flexible portion 26 may be made out of metal gooseneck tubing having a diameter of about 18 millimeters and a length of about 600 millimeters. The distal end 40 of the flexible portion 26 may be configured to receive the threaded stud 28 having a proximal threaded end 44 and a distal threaded end 46. As depicted, the body 48 of the threaded stud 28 may be provided with a 45-degree bend.

As will described in further detail below, the ball and socket connector 18, which provides for pivotal adjustment of the head 20 with respect to the base 14 and the neck 16, includes a ball 50 that is configured to receive the distal end 46 of the threaded stud 28.

The head 20 of the holder 10, in the depicted embodiment, includes a three-point clamp structure 52 having a first arm 54 on a first side 56 and second and third arms 58, 60 on a second side 62 of the head 20. The second and third arms 58, 60 are positioned on the two corners of the second side 62 of the head 20. In the depicted embodiment, the head 20 of the holder 10 is configured to be mechanically coupled to the tablet 12. According to one embodiment, the head 20 of the holder 10 is directly coupled to the electronic device 12 via the first, second and third arms 54, 58, 60 that elastically flex to receive the tablet 12. In one embodiment, the head 20 or portions thereof may be formed out of a polymeric material to provide the desired flexibility.

The present disclosure and the embodiments described herein enable a user to use his or her tablet 12 hands-free and to adjust the tablet 12 in approximately a 360-degree of freedom to preferred vertical and horizontal positions, in a preferred inclination and orientation, including for landscape and portrait viewing. According to one example embodiment, the tablet 12 can be adjustable 360 degrees along a roll spherical axis and about 45 degrees along the yaw and pitch spherical axes (see FIG. 10).

Figure 2:
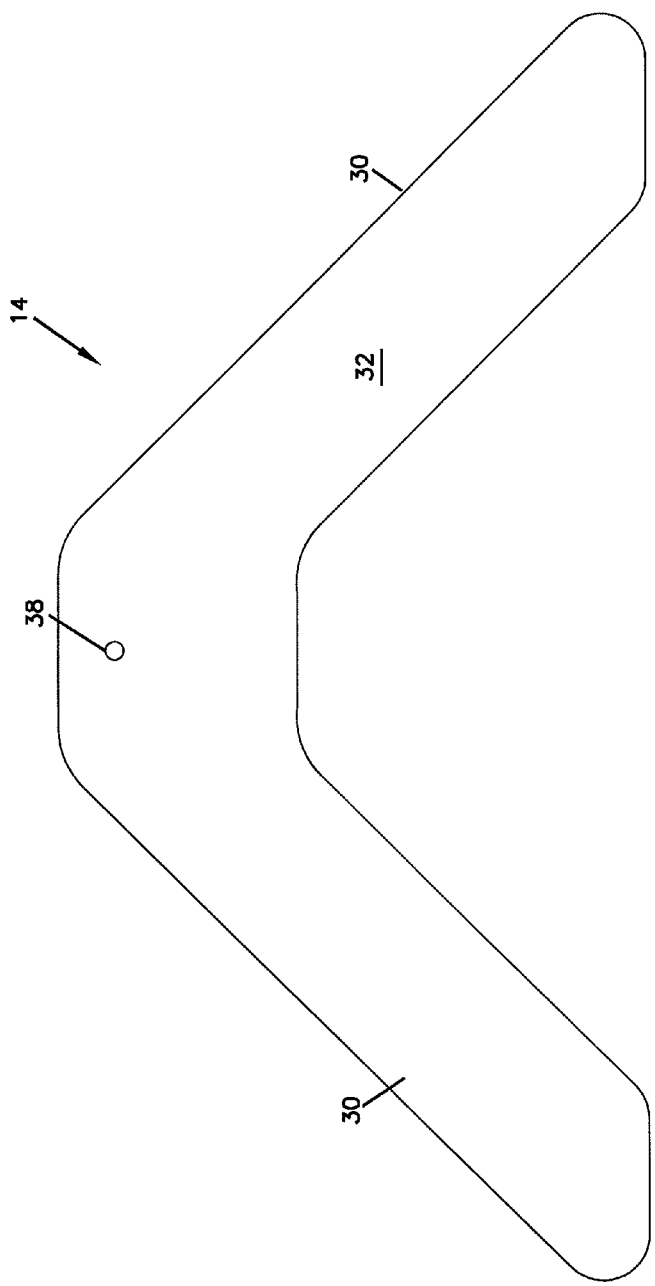
FIG. 2 illustrates a base of the holder of FIG. 1.

Referring now specifically to FIG. 2, the base 14 of the holder 10 is illustrated. According to the depicted embodiment, the base 14 includes the flat platform structure that includes lateral extensions 30 that create a V-shape. As noted above, the base 14 may be manufactured of metal and may include surface texturing, giving the base a rough feel. The lateral extensions 30 forming the V-shape structure 32 of the base 14 may provide great stability to cantilever the tablet 12 toward a person seated or reclined.

According to one embodiment, the base 14 has a total length of about 22.702 inches and a total width of about 10.50 inches, each lateral extension 30 having a width of about 3.125 inches. As shown in FIG. 2, the V-shape of the structure 32 results in the apex 38 being at a desired distance of about 11.351 inches from the outer edge of each lateral extension 30 and at a desired angle of about 82 degrees. The V-shaped, essentially flat base 14 allows for greater stability and the rough texture of the base 14 combined with the essentially flat V-shaped structure 32 form allows for placement on the floor as well as placement between soft surfaces such as a mattress and box springs for use in a bed.

Figure 3:
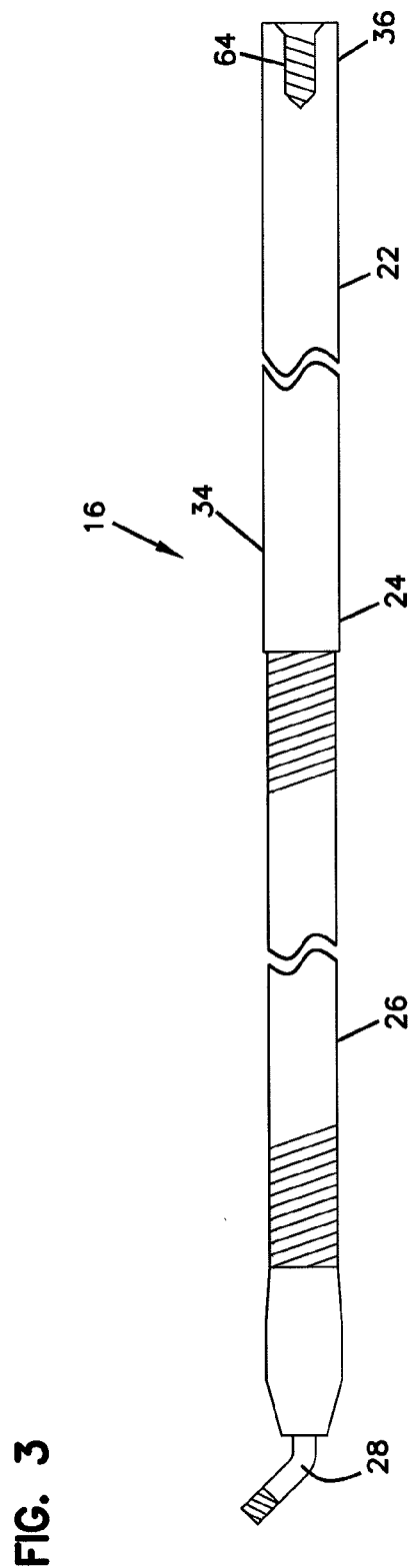
FIG. 3. illustrates a neck of the holder of FIG. 1, the neck, in the depicted embodiment, including a rigid portion which is configured to attach to the base of FIG. 2, a crimp portion which is configured to couple a flexible portion of the neck to the rigid portion of the neck, and a threaded stud portion.
Figure 4:
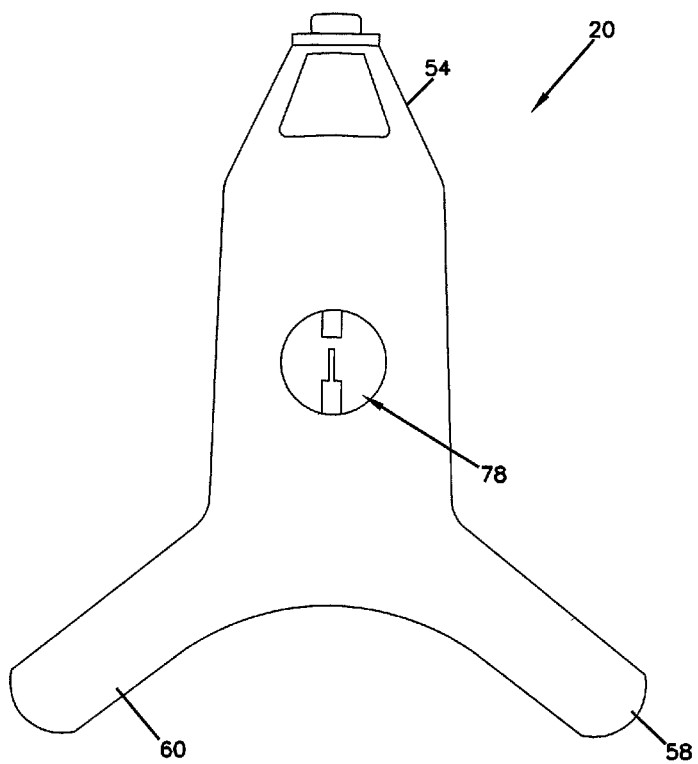
FIG. 4 illustrates a rear view of the head of the holder that is, in the depicted embodiment, configured to cradle an electronic device such as a tablet in a three-point clamp.
Figure 5:
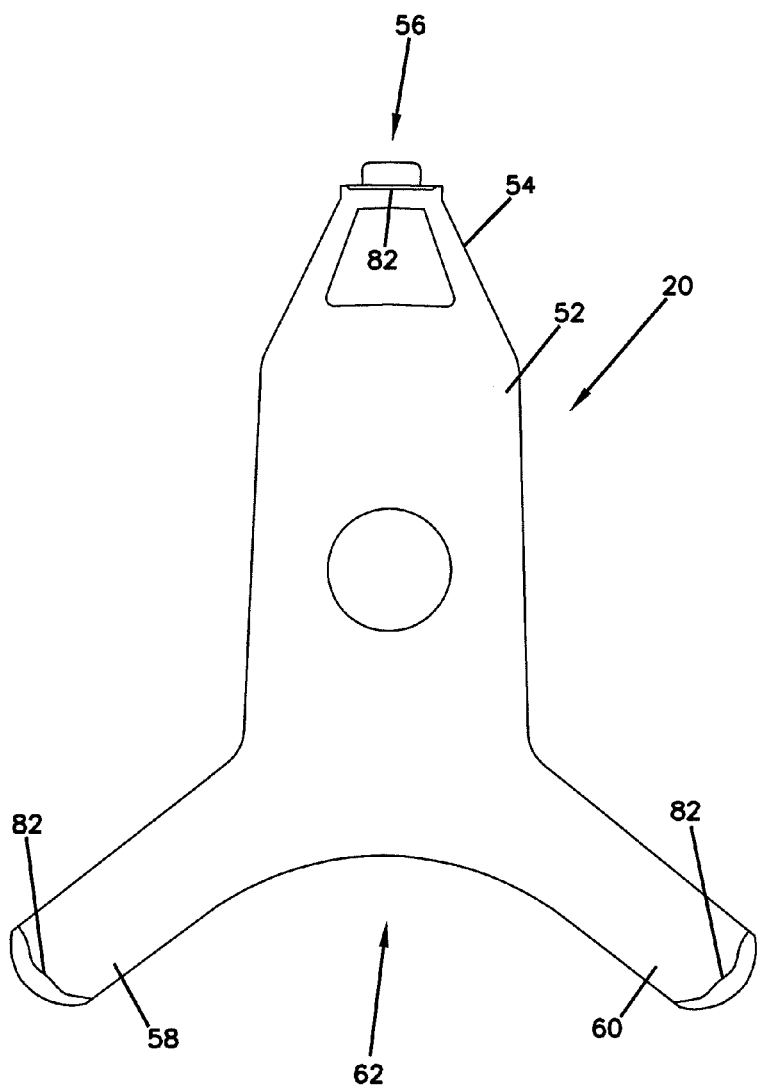
FIG. 5 illustrates a front view of the head of the holder.
Figure 6:
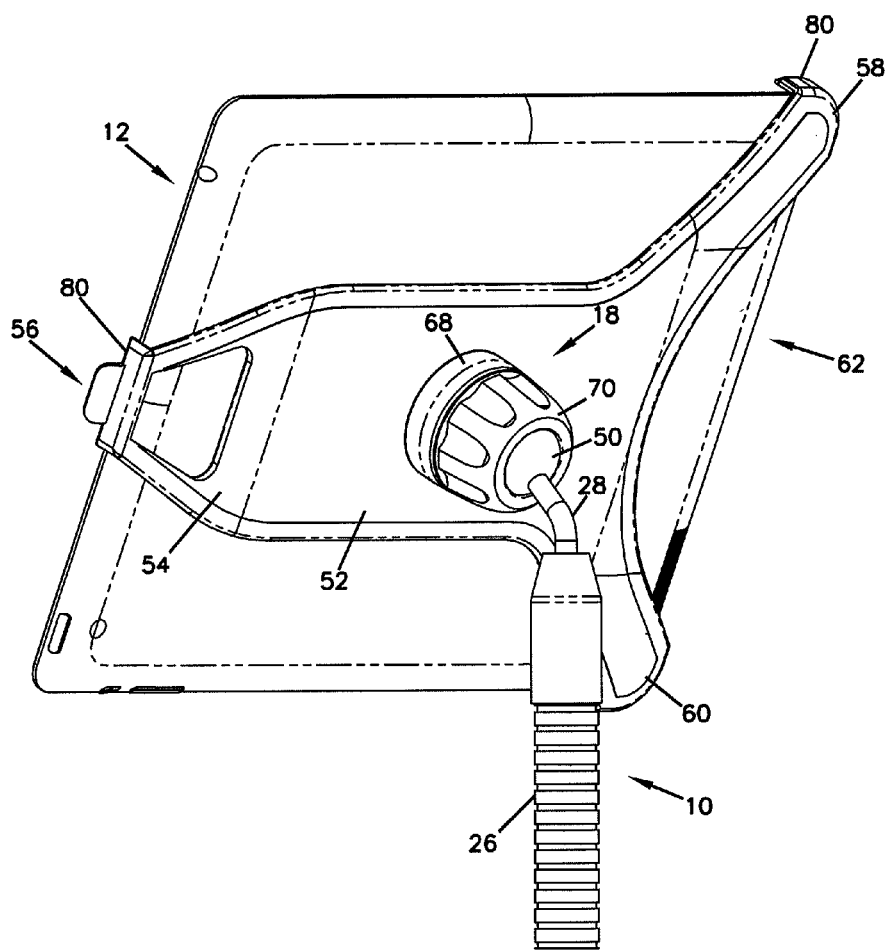
FIG. 6 illustrates a rear perspective view of an electronic device such as a tablet being held by the holder of FIG. 1.
Figure 7:
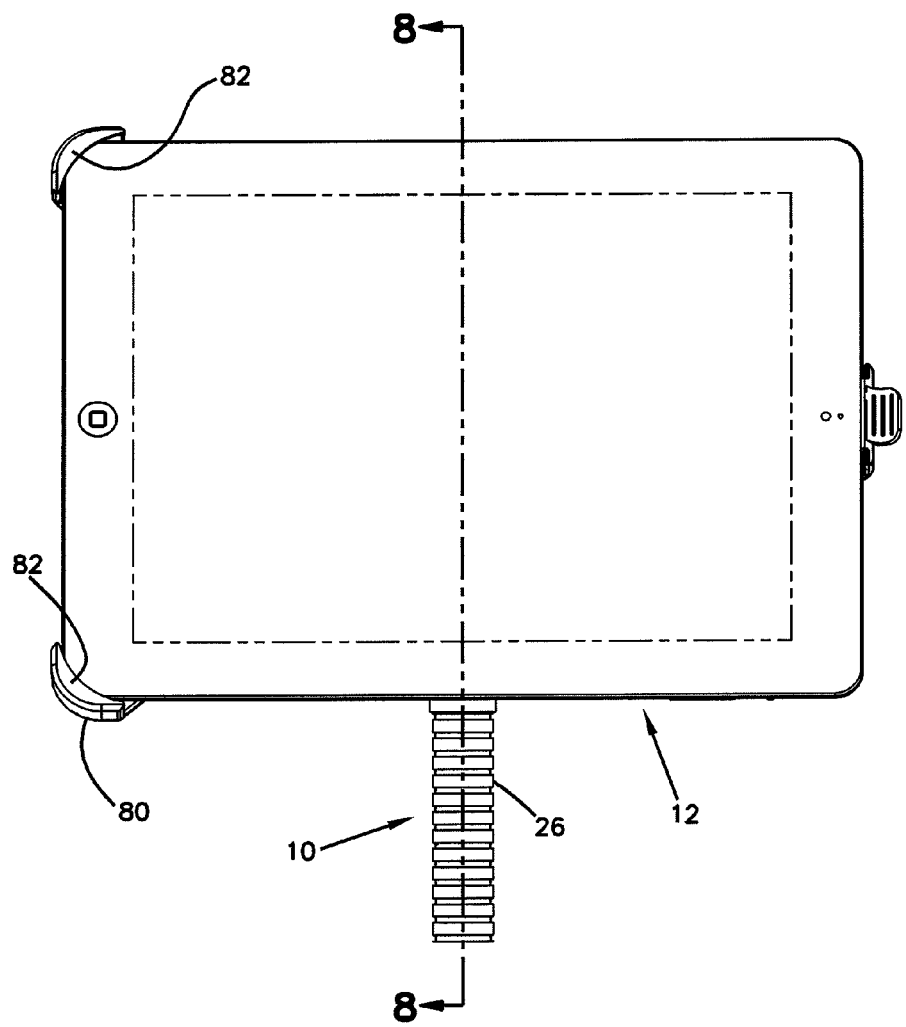
FIG. 7 illustrates a front view of the electronic device being held by the holder of FIG. 1.
Figure 8:
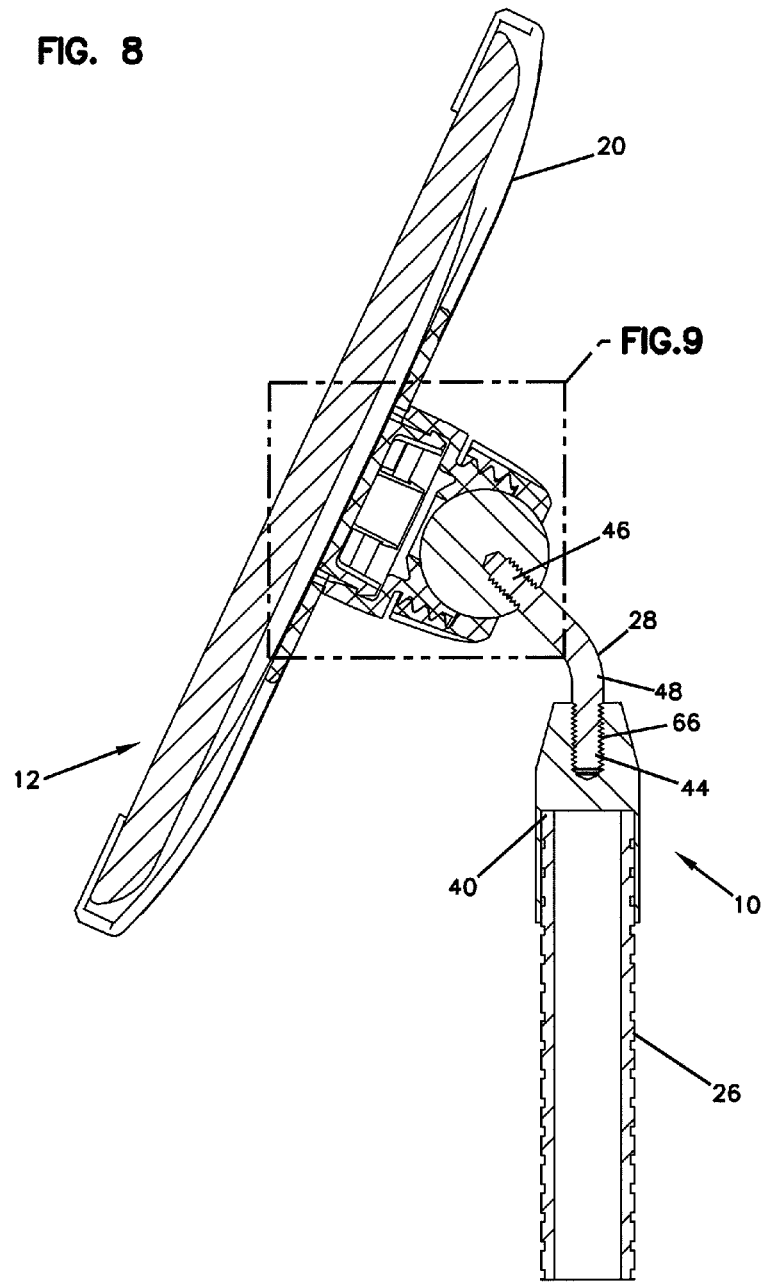
FIG. 8 is a cross-sectional view of the holder and the tablet of FIG. 7 taken along line 8-8 of FIG. 7.
Figure 9:
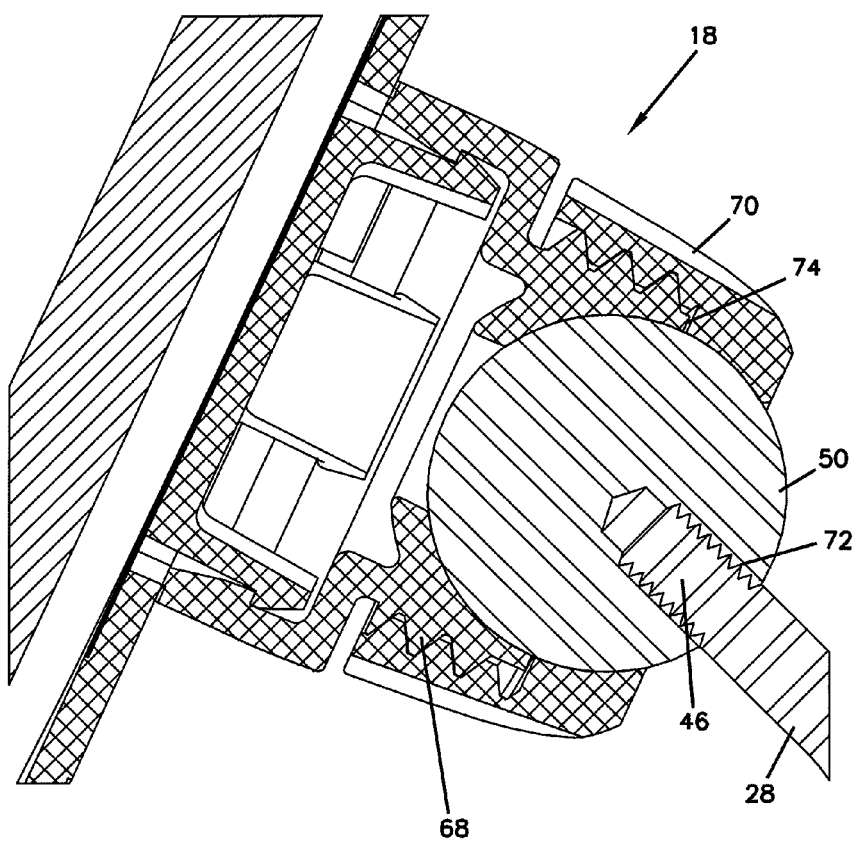
FIG. 9 is a close up view of the cross-section of FIG. 8 illustrating the ball and socket connector of the holder in detail.

Now referring to FIGS. 1 and 3, the rigid portion 22 of the neck 16 of the holder 10 is configured to attach to the base 14 at the apex 38 of the V-shaped platform 32. As depicted, the proximal end 36 of the rigid portion 22 may include a threaded bore 64 for receiving a fastener for the purpose of attaching to the base 14. The rigid portion 22 may allow for greater strength and stability of the holder 10.

As shown in FIGS. 1, 3, and 6-8, the flexible portion 26 of the neck 14, as noted above, may include metal gooseneck tubing having distal and proximal ends 40, 42. The flexible portion 26 is attached to the rigid portion 22 of the neck 14 via the crimp portion 24 of the neck 14 as shown in FIG. 3. The flexible portion 26 is capable of maintaining adjustment of the distal end 40 thereof to a preferred vertical and horizontal position. The flexible portion 26 of the neck 14 is configured to allow for the holder 10 to hold a tablet 12 of approximately 900 grams at any angle when the base 14 is placed on a flat surface.

As noted above, the distal end 40 of the flexible portion 26 is configured to receive the threaded stud 28 having a proximal threaded end 44 and a distal threaded end 46. As depicted, the distal end 40 of the flexible portion 26 may include a threaded internal bore 66 for receiving the threaded proximal end 44 of the stud 28. The 45-degree bend provided to the body 48 of the threaded stud 28 may allow for additional range of motion of the holder 10.

Referring now to FIGS. 1, 6, 8, and 9, the ball and sock connector 18 of the holder 10 includes a socket 68 that is configured to engage the head 20 of the holder 10 and the ball 50 that is configured to be captured within the socket 68 with a threaded nut 70 that is fastened on the socket 68. The ball and socket connector 18 allows for pivotal adjustment of the head 20.

The ball 50, which has a diameter of about ¾" in one embodiment, includes an internally threaded bore 72 that receives the distal end 46 of the threaded stud 28. Once the ball 50 is firmly engaged with the threaded stud 28, the slideable, rotatable interaction of the ball 50 within the socket 68 allows the head 20 of the holder 10 to have approximately 360-degree adjustability along at least one axis. According to one example embodiment, the tablet 12 can be adjustable 360 degrees along a roll spherical axis and about 45 degrees along the yaw and pitch spherical axes (see FIG. 10). This allows for not only landscape and portrait viewing of an attached tablet 12 but also allowing for a wide range of swivel and tilt in all directions to a preferred inclination and orientation.

The socket 68, in the depicted example embodiment, a portion 74 that receives the ball 50. The portion 74 can be clamped against the ball 50 via the threaded nut 70 once a desired position for the tablet 12 is established and the ball 50 is ready to be locked in place.

Referring now to FIGS. 1, 4-6, 8, and 9, the ball and socket connector 18 is configured to be attached to a rear 76 of the head 20 of the holder 10 as shown. The head 20 may be removably attached to the ball and socket connector 18. The socket portion 68 may include an engagement mechanism at the end opposite from the clamping end for removable attachment to the head 20, wherein the head 20 may include a complementary engagement mechanism 78 for removably receiving the socket 68.

As noted above, the head 20 or portions thereof may be made of polymeric material, which provides the flexibility needed to receive and cradle the tablet 12 in a three-point clamp.

In the depicted embodiment, the head 20 includes the first arm 54 on the first side 56 and second and third arms 58, 60 on the second side 62 of the head 20. The second and third arms 58, 60 are positioned on the two corners of the second side 62 of the head 20. Each of the arms 54, 58, 60 may include forwardly extending portions 80 at the outer ends thereof for receiving and cradling the tablet 12. The forwardly extending portions 80 may include tabs 82 that extend in a direction toward a center of the tablet 12. The tabs 82 are configured to provide a snap-fit engagement between the head 20 and the tablet 12 and limit removal of the tablet 12 from the head 20. The polymeric make-up of the head 20 allows for a lightweight design and easy insertion and removal of the tablet 12.

With the features of the above-described embodiment, a tablet 12 may be positioned in nearly any convenient orientation for operation and viewing. When the head 20 of the holder 10 is in the desired position, the ball and socket connector 18 can be tightened by rotating the nut 70, resulting in a locked secure fixed orientation.

Although in the foregoing embodiment, the holder 10 is described and illustrated as having a base 14 that is configured to stand on a surface, in other embodiments, the base 14 can be configured for mounting to an appliance surface, a dashboard, a table top, a desk top, a wall surface, a floor surface, or to any desired surface.

The above described holder 10 includes features for adjusting orientation, attitude, and position of the electronic device such as a tablet 12. The holder 10 provides direct secure fixed engagement of the tablet 12 regardless of its orientation, attitude, and position. The head 20 of the holder 10 provides for rapid and easy engagement and removal such as in a quick-connect and quick-disconnect mechanism for the tablet 12. Although in the depicted example embodiment, the holder 10 is described and illustrated as using a ball and socket connector 18, the 360-degree adjustability may be provided using a variety of other mechanical methods including swivels, bearings, flexible members, magnets, detents, pivots, hinges, and combinations therebetween.

Figure 10:
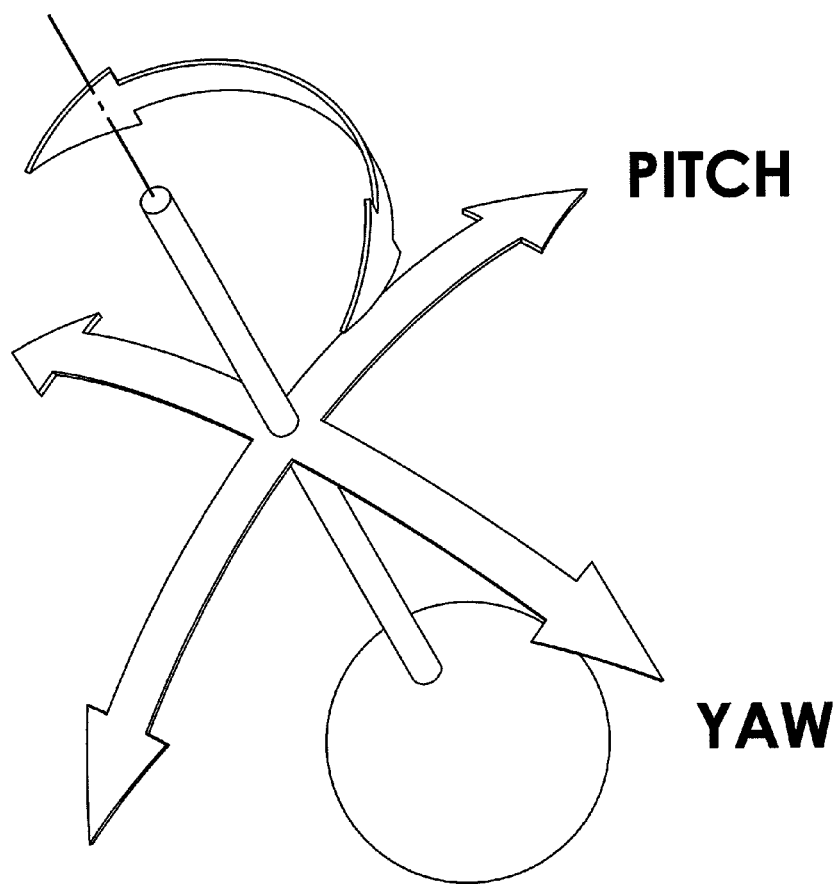
FIG. 10 is a diagrammatic view illustrating the yaw, the pitch, and the roll axes the electronic device is capable of being rotated about using the ball and socket connector of the holder of FIG. 1.
Figure 11:
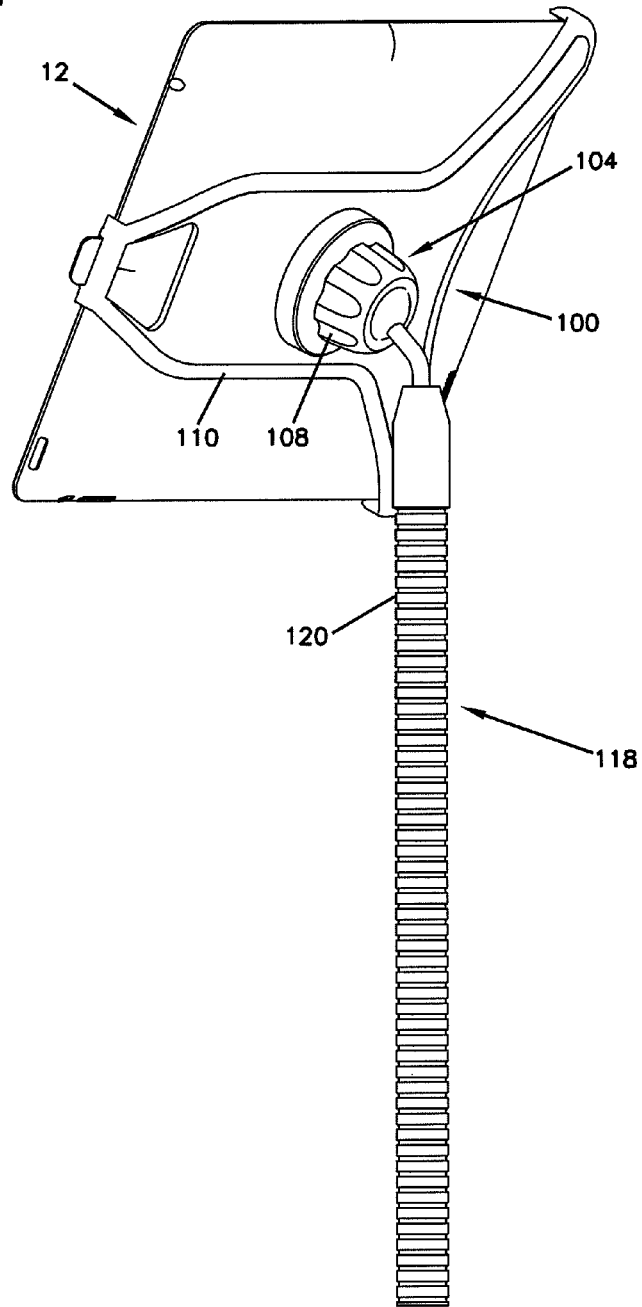
FIG. 11 is a second embodiment of a holder having features that are examples of inventive aspects in accordance with the present disclosure, the holder shown without a base.
Figure 12:
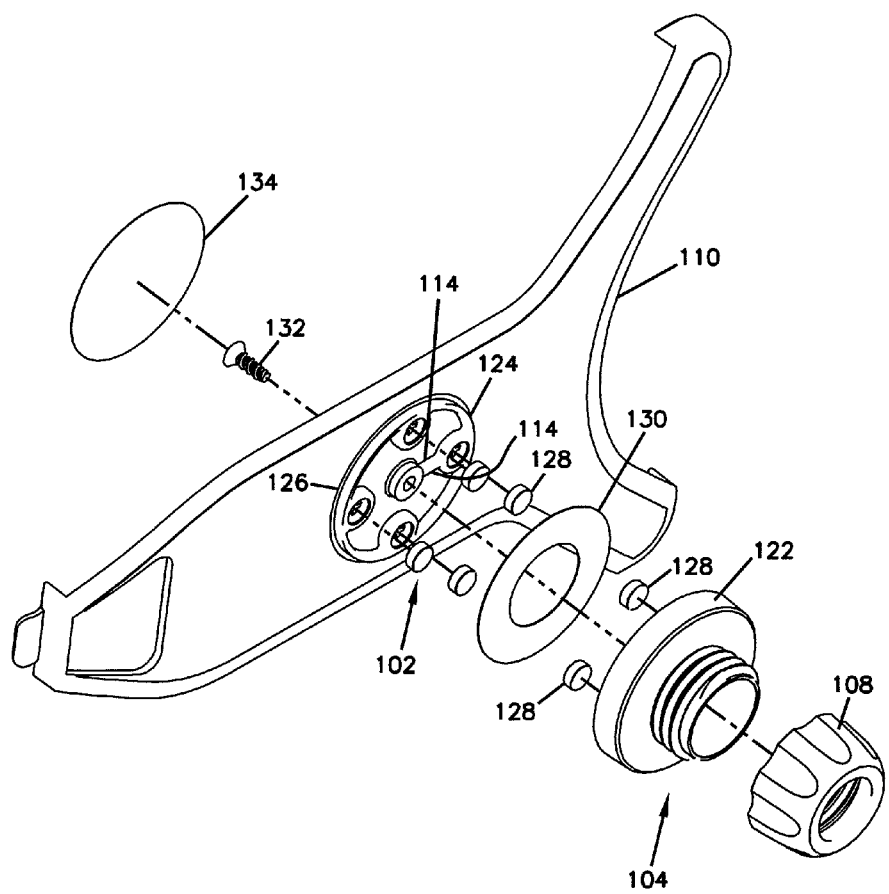
FIG. 12 is an exploded view of the head portion of the holder of FIG. 11.

Referring now to FIGS. 10-12, a second embodiment of a holder 100 having features that are examples of inventive aspects in accordance with the present disclosure is shown. Although the holder 100 is shown without a base, it should be noted that any of the features related to the base 14 described above for the first embodiment of the holder 10 are fully applicable to the second embodiment of the holder 100.

As noted previously, many modern electronic devices such as tablets 12 now alter their displayed image orientation by the rapid change from physical landscape to portrait orientation simply by rotating the device 90 degrees to the new preferred orientation. These newer electronic devices such as tablets 12 sense their attitude using an internal sensor such as an accelerometer. These accelerometers can have as many as 3-axes and can be electronically monitored by the computer and converted to data for use with their software. The software can then determine finger gestures or rotational accelerations which the user creates to change the orientation of the image on the electronic device. For example, the display can quickly change from portrait to landscape left with a 90-degree counterclockwise rotation of the tablet 12.

Thus, in addition to providing a wide-range of swivel and tilt in all directions (e.g., positioning in at least 3-axes such as yaw, pitch, and roll), as featured in the first embodiment of the holder 10 of FIGS. 1-9, the second embodiment of the holder 100 additionally includes features for allowing ease of motion in the roll axis without disturbing the preferred yaw and pitch axes, which accommodates for rapid and frequent need to change from landscape orientation to portrait orientation of the tablet 12. The yaw, pitch, and roll axes have been diagrammatically illustrated in FIG. 10.

In the second embodiment of the holder 100 illustrated specifically in FIGS. 11 and 12, a swiveling or rotary joint 102 has been added to a ball and socket connector 104 so that the holder 100 can be easily rotated from landscape orientation to portrait orientation without disturbing the already set and locked desired yaw and pitch axes.

As will be described in further detail below, the rotary swiveling joint 102 can include additional features to provide stable positions at 90-degree intervals. These stable positions can be provided by features such as detents or locks, or even magnetic structures creating magnetic nodes.

For example, the rotary joint 102 may be provided by a spring engaged pawl that can be used to nest into suitable notch at each 90-degree interval. When a pawl is nestled into a notch, rotation would be suspended until a predetermined break-away torque is imparted. As such, the holder 100 can provide easy rotation between quadrants such as 9 o'clock, 12 o'clock, and 3 o'clock on a clock dial, but relative stability at each quadrant point. If magnets are used, magnets can be used to provide tactile feedback at each of the quadrants or provide the holding torque with stable resting nodes.

In addition, the rotary joint 102 can provide end stops 106 in each rotational direction to limit the degrees of freedom to any desired angle such as 180 degrees. The benefit of limiting the rotation to 180 degrees may be that once the rotation is stopped by an end stop 106, the holder 100 itself can be used as a torque arm to tighten or loosen a threaded nut 108 of the ball and socket connector 104. Without any rotation limits, the nut 108 could be difficult to tighten as the joint 102 might allow a head 110 of the holder 100 to free wheel.

As will be described in further detail below, the end stops 106 can be provided by tabs 112 that engage opposing surfaces 114. When a user wants to tighten or loosen a ball 116 of the ball and socket connector 104, the end stops 106 can be engaged to provide the needed torque.

Alternately, instead of providing end stops 106, any features that are opposing the rotational direction of the threaded nut 108 can be grasped by the other hand of the user as counter torque for loosening and tightening the nut 108.

As will be described in further detail below, the rotary joint 102 that provides rapid change between landscape and portrait orientations about the roll axis without disturbing the yaw and pitch axes can be configured to be easily and effortlessly turned from end to end or have pre-defined nodes of stability.

Referring now to FIG. 10, a diagram of the degrees of flexibility provided by the ball and socket connector 104 is shown. When using the second embodiment of the holder 100, the pitch, yaw, and initial roll axes may be chosen by allowing the ball 116 to pivot in any axis until the desired position is selected. The ball nut 108 can then be tightened securely to prevent any relative pitch, yaw, or roll motion. However, the additional rotary joint 102 of the second embodiment of the holder 100 allows controlled rapid motion in the roll axis without disturbing the yaw and pitch axes.

Referring now specifically to FIGS. 11 and 12, the second embodiment of the holder 100 is shown as cradling a tablet 12. Aside from the additional rotary joint 102 between the ball and socket connector 104 and the head 110 of the holder 100, the second embodiment of the holder 100 can include any of the features of the first embodiment of the holder 10, and, thus, those features will not be discussed in great detail herein. For example, the holder 100 is shown in FIG. 11 with a neck 118 having a flexible gooseneck portion 120. Only the differences between the different embodiments of the holders will be described in detail herein.

FIG. 12 illustrates an exploded view of the ball and socket connector 104 and the rotary joint 102 of the holder 100. The head portion 110 of the holder 100 is similar to the head portion 20 of the first embodiment of the holder 10 in that the head 110 is directly snap-fit to an electronic device such as a tablet 12 via elastically flexible portions.

The rotary joint 102 is formed between a socket member 122 of the ball and socket connector 104 and the head 110 of the holder 100. The rotary joint 102 is formed by a circular protrusion 124 on the head portion 110 that receives the socket member 122 with a snap fit. The circular protrusion 124 defines a track 126 around the outer perimeter thereof for allowing the socket member 122 to rotate about the protrusion 124 to allow quick orientation change about the roll axis.

In the illustrated example of the rotary joint 102, magnets 128 are used to provide the holding force and the tactile feedback at each of the quadrants. Both the head 110 and the socket member 122 are populated with magnets 128 that are configured to be aligned in an axial configuration to provide discrete temporary locking positions for the rotary joint 102. In the depicted embodiment, a suitable slip disk 130 is used to provide a controlled friction-reducing gap between magnets 128 of approximately 0.005" to 0.030".

The socket member 122 is secured to the ball 116 of the ball and socket connector 104 with the threaded nut 108, similar to the first embodiment of the holder 10. The ball and socket connector 104, as discussed, provides full adjustability, and, once set and tightened in place, allows the rotary joint 102 to be used for quick orientation changes about the roll axis.

Figure 29:
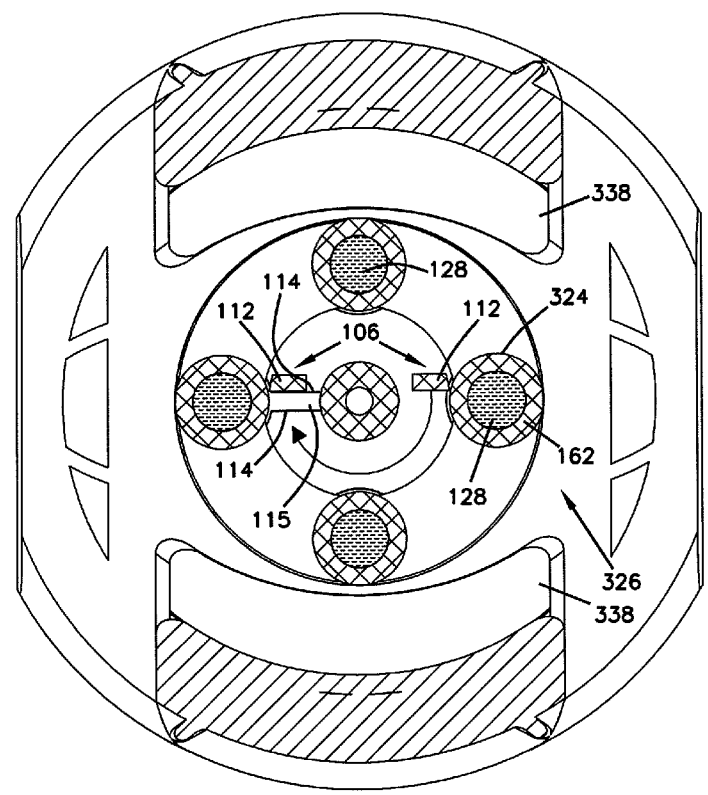
FIG. 29 is a cross-sectional view taken along line 29-29 of FIG. 27.

In the depicted embodiment, an end-stop 106 is provided for the rotary joint 102, wherein the head portion 110 of the holder 100 includes an engagement surface 114 that is contacted by a pair of oppositely positioned tabs/protrusions 112 provided on the socket member 122 to define the end-stops 106 (please see FIG. 29 for a similar feature). The engagement surface 114 is shown at the 3 o-clock position on the head 110 and interacts with the two opposing protrusions 112 on the rotary socket 122 to limit the rotation from −90, to +90 degrees. As depicted, a screw 132 holds the rotary joint assembly 102 together and an adhesive graphic 134 may be used to hide the screw 132 and decorate the holder 100.

The magnetic force between the magnets 128 of the socket member 122 and the magnets 128 of the head 110 may be broken by rotating the socket 122 with respect to the head 110 in either direction. Each magnet 128 around the circular periphery of both the head 110 and the socket 122 provides a discrete locking position about the roll axis.

Figure 13:
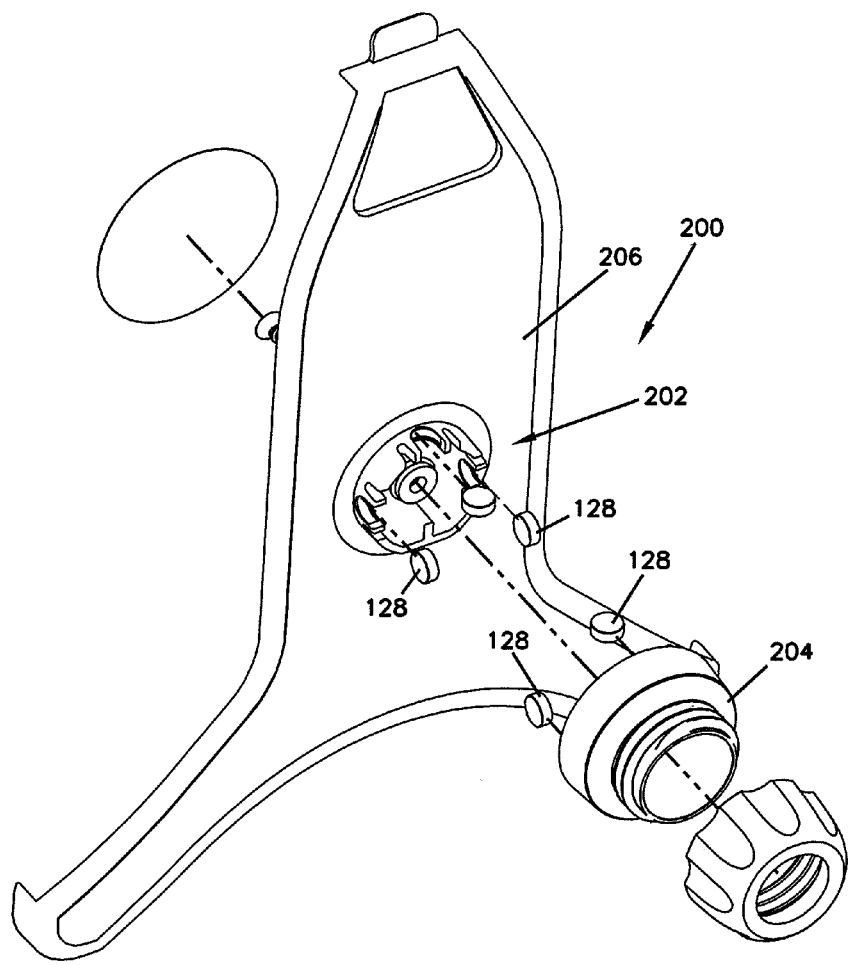
FIG. 13 is an exploded view of the head portion of a third embodiment of a holder having features that are examples of inventive aspects in accordance with the present disclosure.
Figure 14:
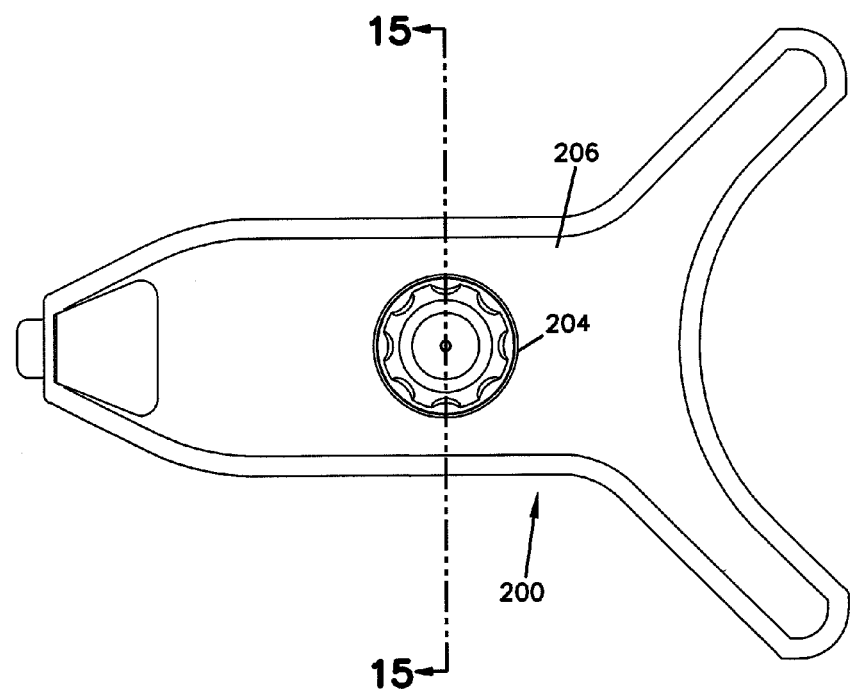
FIG. 14 is a rear view of the head of the holder of FIG. 13.
Figure 15:
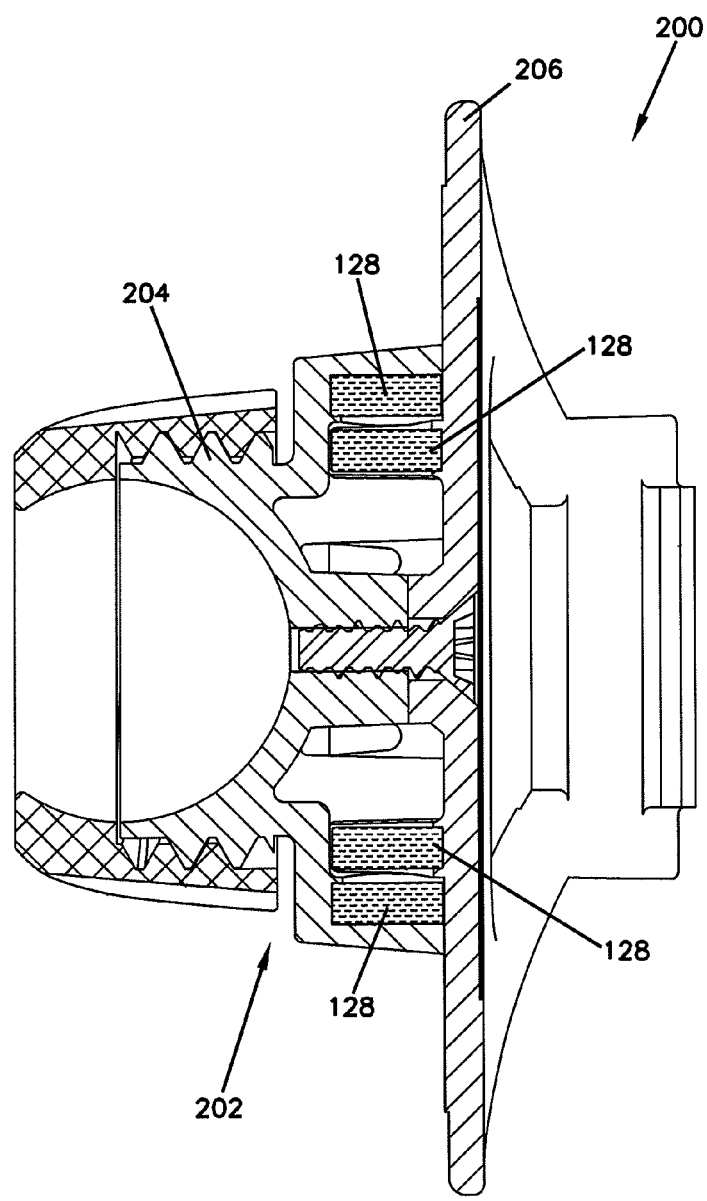
FIG. 15 is a cross-sectional view of the head of the holder of FIG. 14 taken along line 15-15 of FIG. 14.

FIGS. 13-15 illustrate a third embodiment of a holder 200 having features that are examples of inventive aspects in accordance with the present disclosure. The third embodiment of the holder 200 is similar in concept and operation to the second embodiment of the holder 100 except that the third embodiment of the holder 200 includes a rotary joint 202 with radially aligned magnets 128, as shown in the exploded view in FIG. 13.

FIG. 15 illustrates a cross-sectional view taken along line 15-15 of FIG. 14 illustrating the alignment of the magnets 128 of a socket 204 of the holder 200 with those of the head 206 of the holder 200 for providing discrete locking positions. Such a radial alignment arrangement may have the benefit of reduced axial thrust.

In either of the second and third embodiments of the holders 100, 200, eight total magnets 128 may be used, an aligned pair in each quadrant. However, to reduce costs, six magnets 128 can be used, with the understanding that the holding force provided by the magnets 128 will vary from the landscape orientation to the portrait orientation. For example, two pairs would be in alignment at either landscape right or landscape left orientation and three pairs would be in alignment in the portrait orientation, as in the illustrated example of FIG. 13. In other embodiments, at least one magnet and one steel target may be used to establish the magnetic connection.

FIGS. 16-33 illustrate a holder system 300 including a fourth embodiment of a holder 302 having features that are examples of inventive aspects in accordance with the present disclosure and a converter structure 304 for coupling to the holder 302 to an electronic device such as a tablet 12. FIG. 17 specifically illustrates the holder system 300 of FIG. 16 coupled to a tablet 12.

In the illustrated example, a neck 306 of the holder 302 is depicted as including only a threaded stud 308, wherein a head 316 of the holder 302 is directly attached to a base 310 via the threaded stud 308. In the depicted example, the base 310 includes openings 312 for mounting the base 310 to a variety of different surfaces with fasteners as described above. It should be noted that the neck 306 and base 310 illustrated with the fourth embodiment of the holder 302 is simply one example configuration and any other configuration such as those described and illustrated for the first, second, and third embodiments of the holder 10, 100, 200 can be used with the holder system 300 of FIGS. 16-33.

Figure 16:
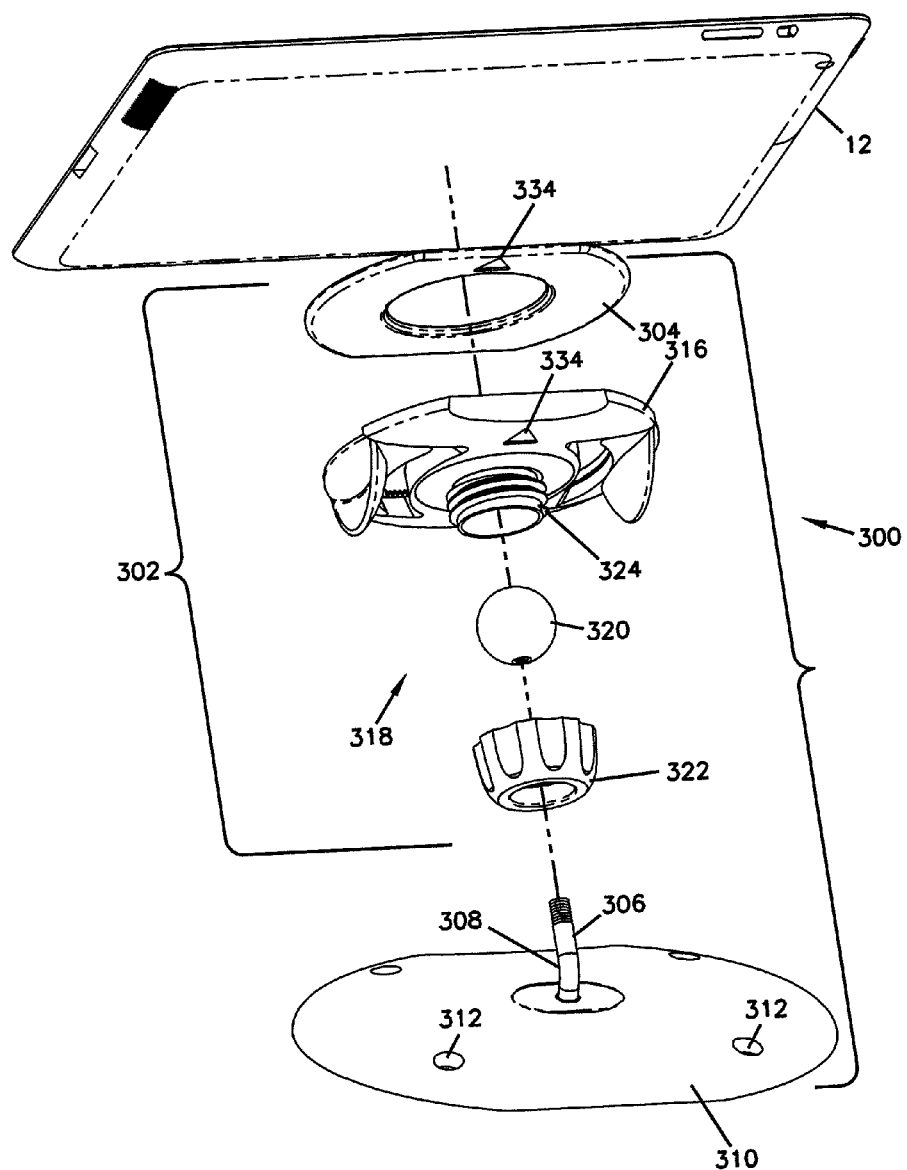
FIG. 16 illustrates a holder system including a fourth embodiment of a holder having features that are examples of inventive aspects in accordance with the present disclosure and a converter structure for coupling to the holder to an electronic device.
Figure 17:
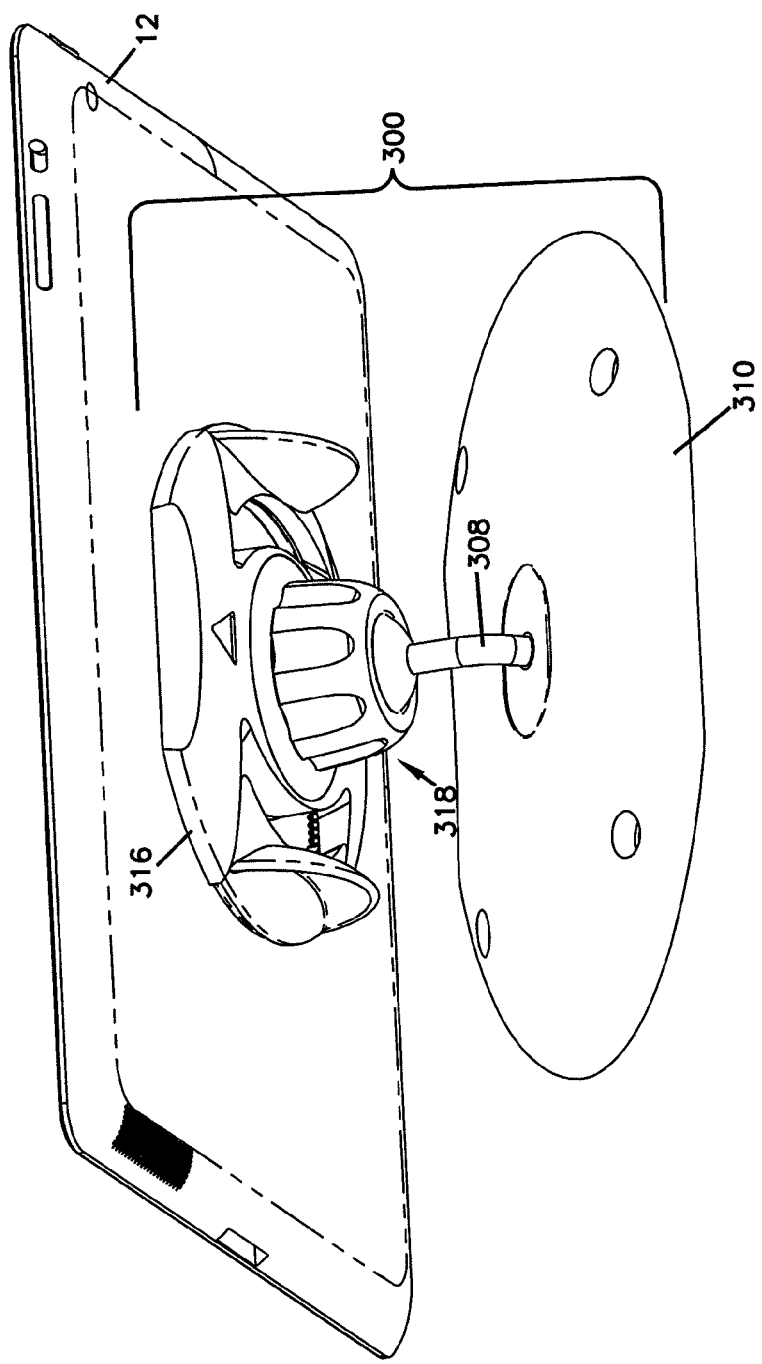
FIG. 17 illustrates the holder system of FIG. 16 used on the electronic device.
Figure 18:
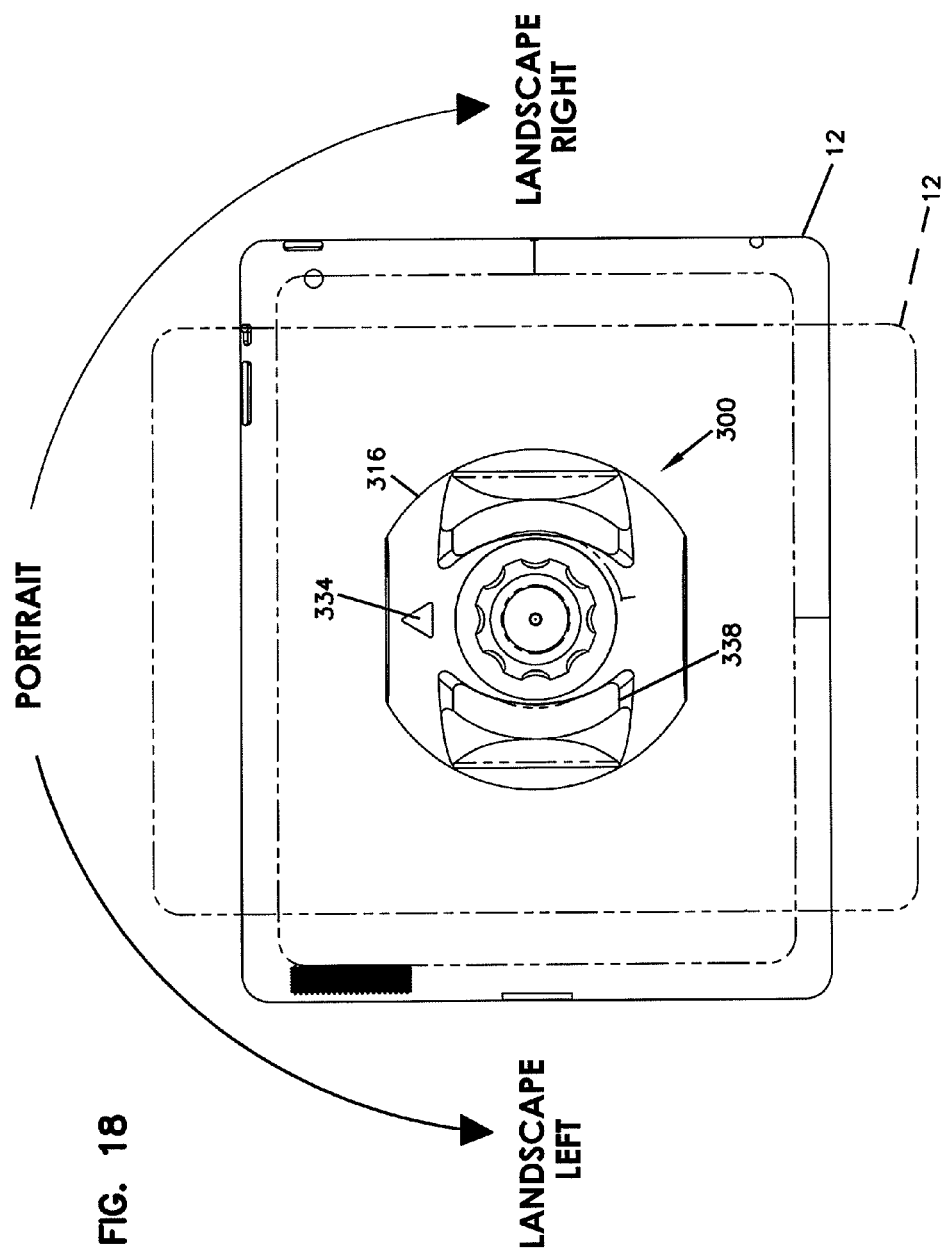
FIG. 18 is a diagrammatic view illustrating the ability of the holder system of FIGS. 16 and 17 to allow a user to rapidly change the displayed image orientation of the electronic device between portrait to landscape by rotating the electronic device 90 degrees.
Figure 19:
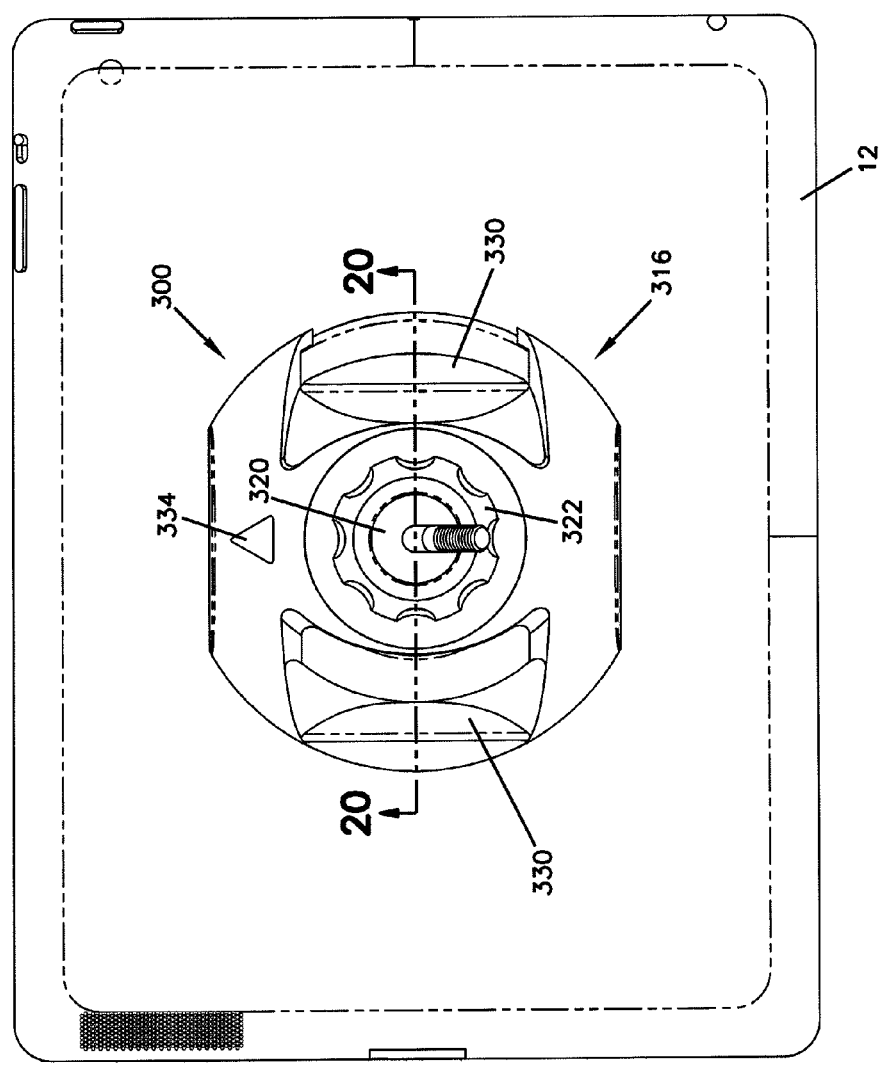
FIG. 19 illustrates a rear view of the holder system of FIG. 16 without the base of the holder system.

FIG. 18 diagrammatic illustrates the ability of the holder system 300 of FIG. 16 to allow a user to rapidly change the displayed image orientation of the tablet 12 between portrait and landscape by rotating the holder 90 degrees. In the holder 302 of the holder system 300 of FIGS. 16-33, as in the second and third embodiments of the holder 100, 200 of the present disclosure, magnets 128 can be used to provide tactile feedback at each of the quadrants or provide holding torque with stable nesting nodes.

As discussed previously, in other embodiments of the holder, instead of using magnets 128, a rotary joint 326 may be provided by a spring engaged pawl that can be used to nest into suitable notch at each 90-degree interval. When a pawl is nestled into a notch, rotation would be suspended until a predetermined break-away torque is imparted. As such, the holder system 300 can provide easy rotation between quadrants such as 9 o'clock, 12 o'clock, and 3 o'clock on a clock dial, but relative stability at each quadrant point.

As will be described in detail below, the holder system 300 of FIGS. 16-33 also provides a quick connect/disconnect feature that enables the user to rapidly remove the tablet 12 from the holder system 300 and also provides a universal type attachment that allows the same holder 302 to be able to be used on a variety of different devices.

In the depicted examples of holders 10, 100, 200 shown in FIGS. 1-15, for example, the head portion of the holder is configured specifically for the electronic device (e.g., a tablet such as an iPad® or an iPad2®) upon which it is attached. Although the head portion of the holders of FIG. 1-15 may be modified or configured for a variety of different devices such as e-book readers, GPS units, cellular phones, etc., the same holder may not be able to be used with two different types of devices.

The fourth embodiment of the holder 302 forms a part of a holder system 300 that provides a universal type docking arrangement, wherein the same arrangement can be used with a variety of devices without having to modify the head 316 of the holder 300.

In certain embodiments, a universal type of a docking arrangement may be provided with movable or adjustable features of the head portion 316 such as arms, fingers, latches, straps, hook-and-loop fasteners (e.g., Velcro™), or adhesive. However, when providing the docking arrangement, it is normally desired that the installation and removal of the electronic device be easy and fast. In the broadest sense, the quick connect/disconnect desire can be accomplished by adapting each electronic device to a given standard docking geometry. In other words, the quick connect/disconnect feature may be provided by converting each electronic device to a given standard holder.

As such, the depicted embodiment of the holder system 300 includes the converter structure 304 that can be adapted to a variety of different electronic devices, wherein the converter structure 304 enables the same "universal" holder (e.g., holder 302) to be used with a variety of different electronic devices.

In certain embodiments, the converter 304 can be permanently or semi-permanently attached to the electronic device using, for example, adhesives. These adhesives can be tailored for long-term permanence using products such as 3M VHB™ foam tapes, or semi-permanence using products such as 3M Command™ adhesive systems.

As will be described in further detail, the converter structure 304 can include a mechanical interlock with the head 316 of the holder 302. In certain embodiments, these mechanical interlock features can be engaged by simple bringing the converter 304 in proximity to the head 316 of the holder 302. Once the converter 304 and head 316 are quickly mated, they remain firmly attached to each other. In this way, the electronic device 12 remains fixedly connected to the head unit 316 and can benefit from the configurable positioning of a ball and socket joint 318 of the holder 302. Further, the electronic device 12 can benefit from easy and speedy clockwise or counterclockwise rotation about the roll axis, stopping at each quadrant as desired.

In the depicted embodiment, the head unit 316 also allows for rapid and easy removal from the converter 304. Removal can be provided by disengaging the mechanical feature by pushing a button, sliding or rotating a lever, a screw, or a cam, twisting, prying or the like. Another method of docking the converter 304 with the head 316 may be provided by using magnets. Neodymium magnets can provide considerable forces in small sizes. These magnets can be separated by simple lateral sliding, or shearing motion.

One example embodiment of a holder system 300 that provides for a quick connect/disconnect arrangement between the head 316 of the holder 302 and a converter structure 304 of the system 300 is described below.

FIG. 16 illustrates the major components of the holder system 300, which may include the base 310, the neck 306 (in this example, the threaded stud 308), the ball and socket connector 318 (which includes a ball 320, a threaded nut 322, and a socket member 324), the head 316, and the converter structure 304.

In FIG. 17, the holder system 300 is shown as being mounted to a planar surface using the base 310. Alternatively, instead of utilizing a base 310, the ball 320 can be attached using the threaded stud 308, to any structure such as a post, a rod, a flexible metal gooseneck, an appliance unit, a wall ceiling, a fuselage, a dashboard, etc.

The electronic device 12 is adapted or converted by attaching the converter structure 304 (shown in detail in FIGS. 30-33) to its back panel 13. The converter 304 can be attached using any mechanical means including pressure sensitive adhesives such as 3M VHB™ or 3M Command™ adhesive.

Figure 20:
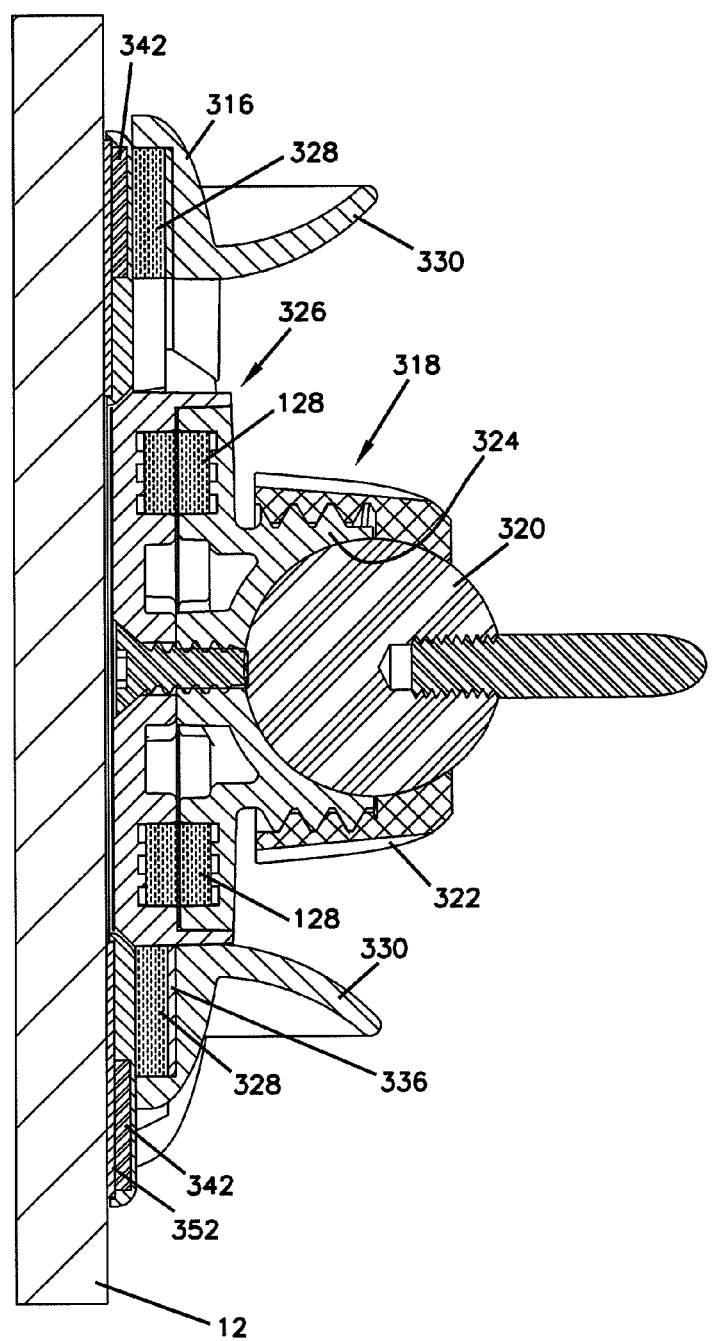
FIG. 20 is a cross-sectional view taken along line 20-20 of FIG. 19.
Figure 21:
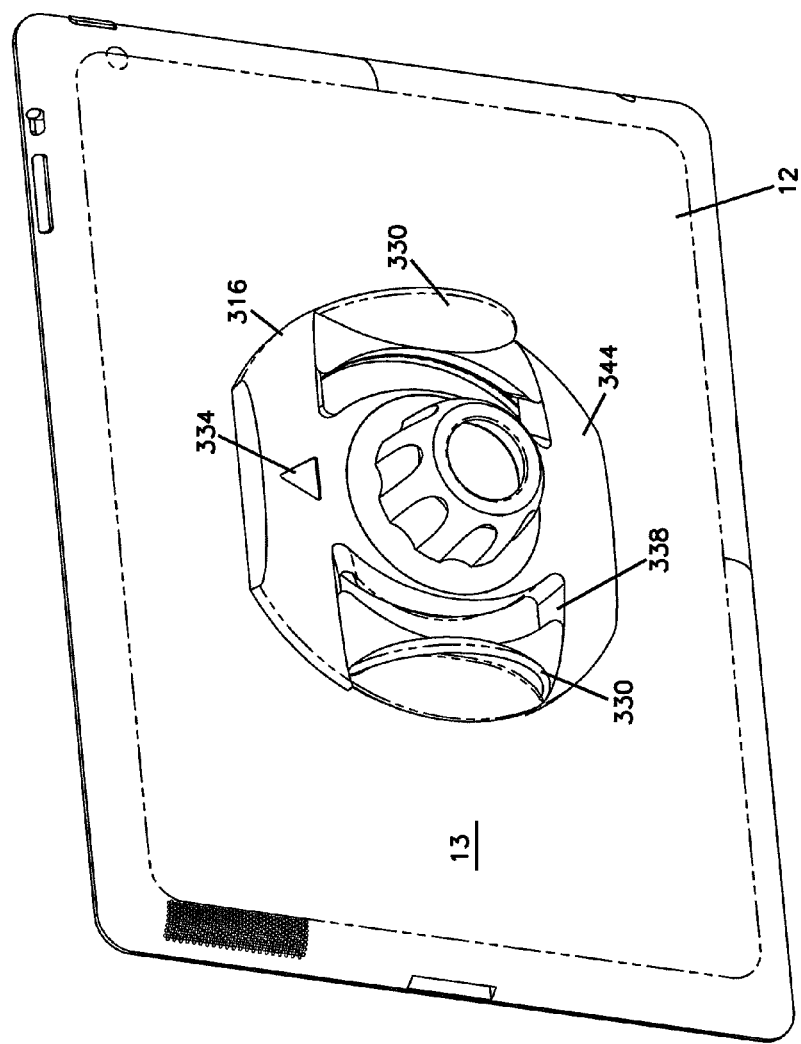
FIG. 21 illustrates the holder system of FIG. 16 used on the electronic device, the holder system shown without a ball of the ball and socket connector and without a neck or the base of the system.

Referring back to FIG. 16, the head 316 can be readily attached to the adapted electronic device 12 by interfacing with the converter 304. FIGS. 16 and 20 depict the converter 304 being attached with pressure sensitive adhesive 352 and the head 316 being releasably attached to converter 304 using neodymium magnets 328. The head 316 can have its yaw, pitch, and roll altered by adjustments to the ball and socket connector 318 which can be locked by tightening the threaded nut 322. Additionally, once the head 316 is attached to the converter 304 and the ball 320 locked in place, the displayed image orientation of the electronic device 12 can be rapidly changed between portrait and landscape by using a rotary joint 326 of the holder 302.

FIG. 18 shows the rear view of the holder system 300 attached to a tablet 12 showing the relative orientations of the tablet 12: landscape left, portrait, and landscape right.

Figure 22:
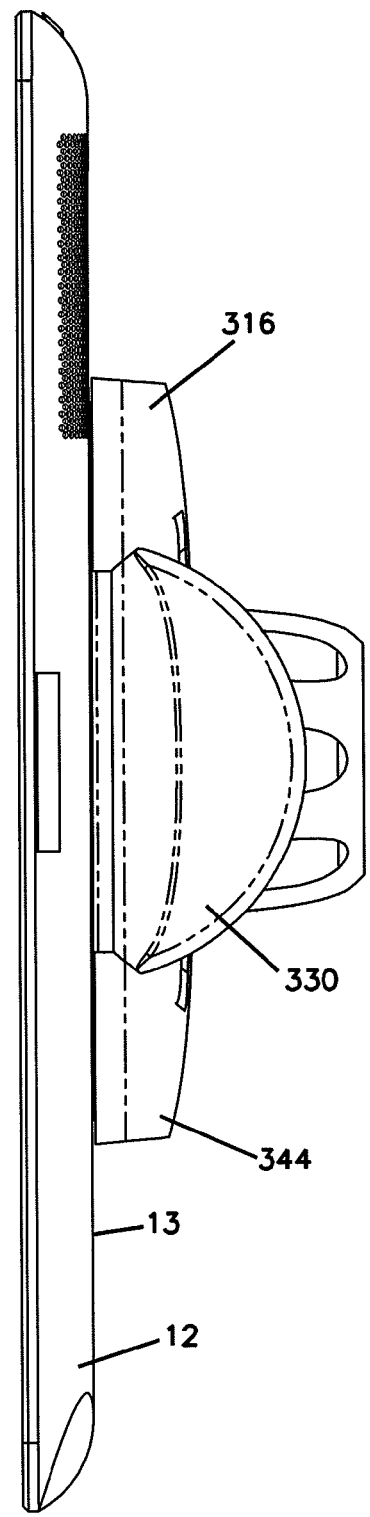
FIG. 22 is a side view of the holder system of FIG. 21.
Figure 23:
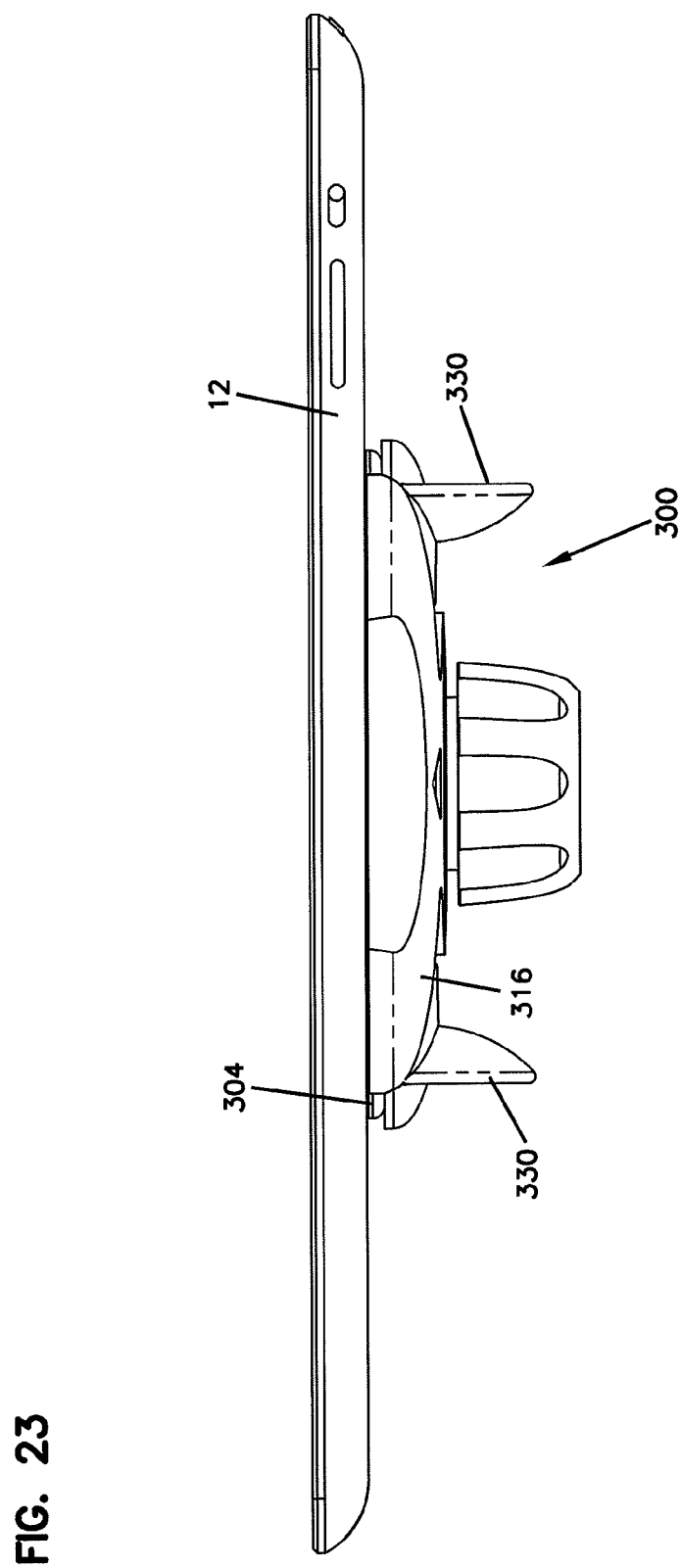
FIG. 23 is a top view of the holder system of FIG. 21.
Figure 24:
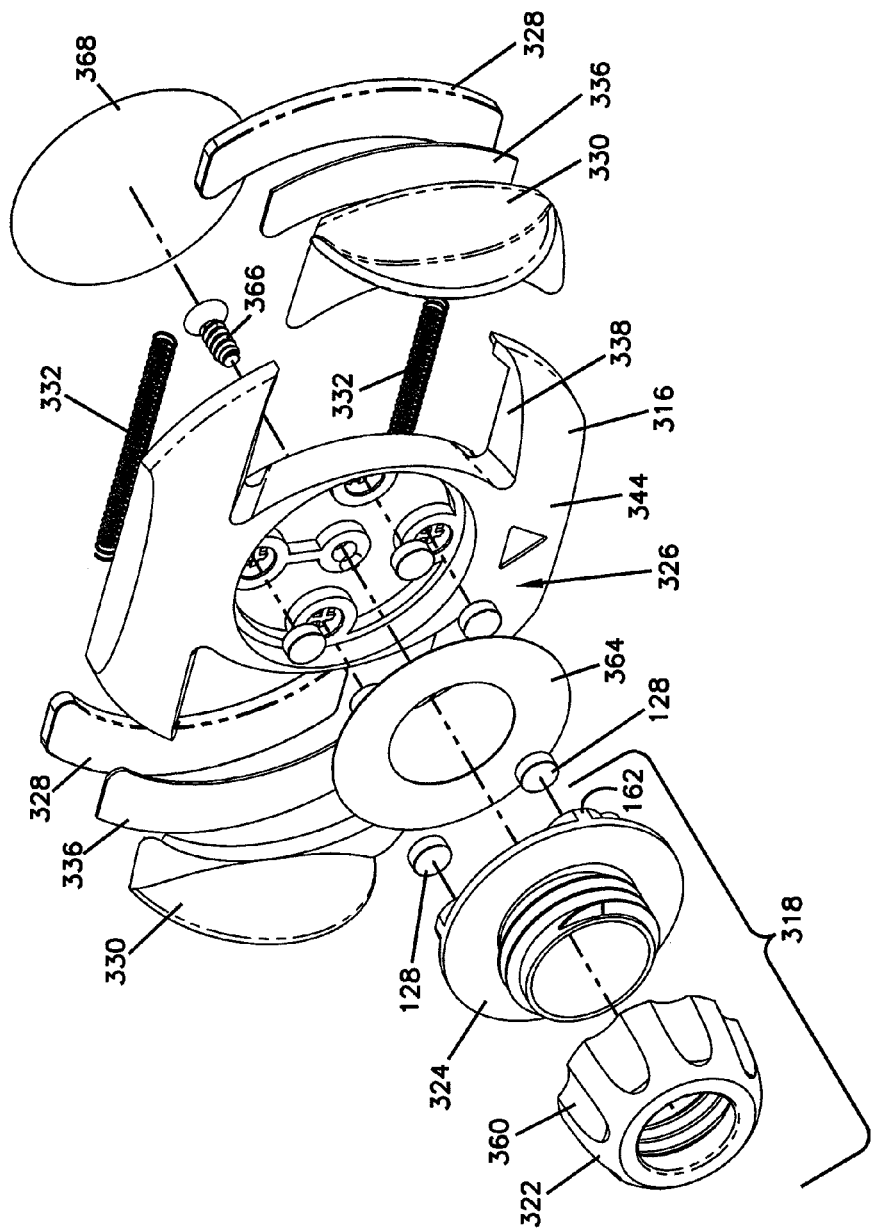
FIG. 24 illustrates an exploded view of the head portion of the fourth embodiment of the holder of FIG. 16.
Figure 25:
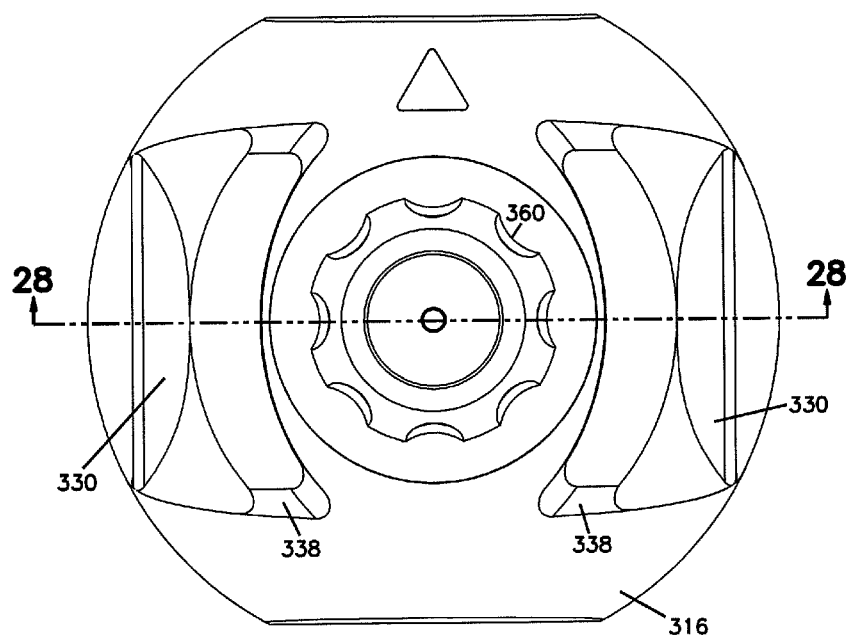
FIG. 25 illustrates a rear view of the head portion of FIG. 24.
Figure 26:
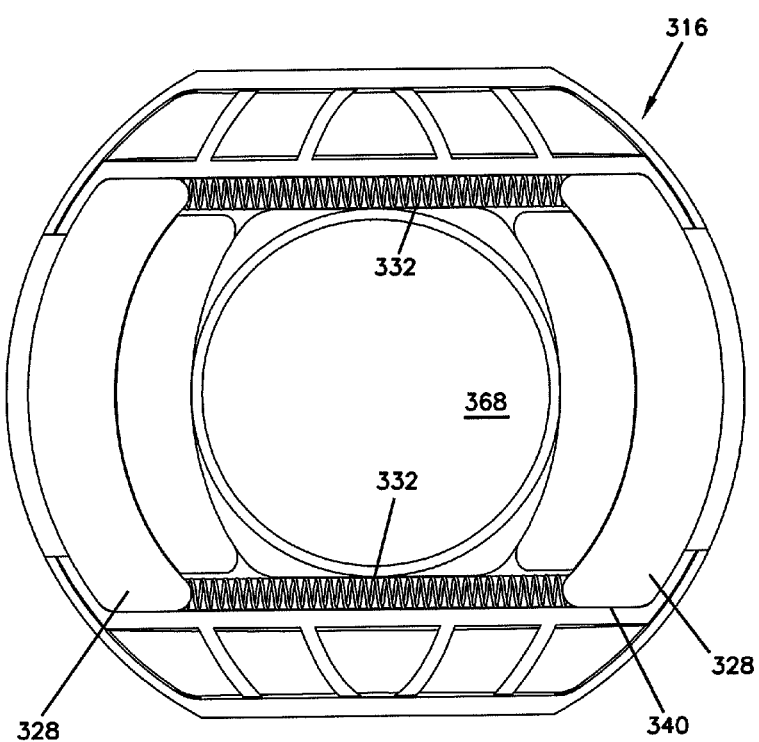
FIG. 26 is a front view of the head portion of FIG. 24.

Referring specifically now to FIGS. 21-29, the head 316 includes a pair of sliding detachment members 330. The detachment members 330 are configured to slide side-to-side from a mounting position to a release position. The detachment members 330 include features for allowing an operator's thumb and fingers to squeeze the members to a release position. As shown in FIGS. 24 and 26, compression springs 332 bias the detachment members 330 to a mounting position. An alignment indicator 334 that associates or keys the head 316 of the holder 302 with the converter structure 304 on the electronic device 12 can be used to keep the electronic device 12 in the preferred orientation when re-connecting.

Each detachment member 330 includes an arcuate magnet 328 attached thereto with adhesive tape 336. FIG. 26 illustrates the head 316 from the front. The arcuate-shaped magnets 328 extend past the dovetail wedged grooves 338 and slide on a track 340 laterally. The compression springs 332 provide a biased force to keep the detachment members 330 mildly biased in the mounting position. It is also anticipated that as the head unit 316 is brought within magnetic proximity to steel targets 342 within the converter structure 304, the detachment members 330 will be magnetically biased outwardly. The main body 344 of the head 316 includes a conical frustum type centering face which serves to align the converter structure 304 axially into the head unit 316 and keep it aligned during the sliding of the detachment members 330 for release.

Referring now to FIGS. 30-33, the converter 304 is shown in detail. The main body 346 of the converter structure 304 may be formed from a suitable molding process such as rim molding, injection molding or the like. Suitable resins may include polyethylene (PE) for its low-cost, lubricity and durability. Additionally, PE can be molded in very thin sections which may shield the steel targets 342 of the converter 304. Thermosets such as urethanes and polyurethanes can also be used. They offer great durability and toughness but with increased surface friction. In still another embodiment, the converter main body 346 can have a plastic film applied over the steel targets 342 such as vinyl or polycarbonate with silk screening as desired. When the detachment members 330 of the head 316 are in their outermost orientation, they are in line with the corresponding steel targets 342. These steel targets 342 are of such thickness so as to yield the majority of magnetic attraction force without being excessively thick. The targets 342 can be plated steel to reduce corrosion with electroless nickel, yellow zinc or similar treatments. The bottom 350 of the converter 304 may be used to provide room for an adhesive strip 352. 3M Command™ can be used to provide for a semi-permanent attachment and can be released by pulling on a tab to release the adhesive with shear forces. 3M VHB™ can be used for a more permanent attachment.

Figure 30:
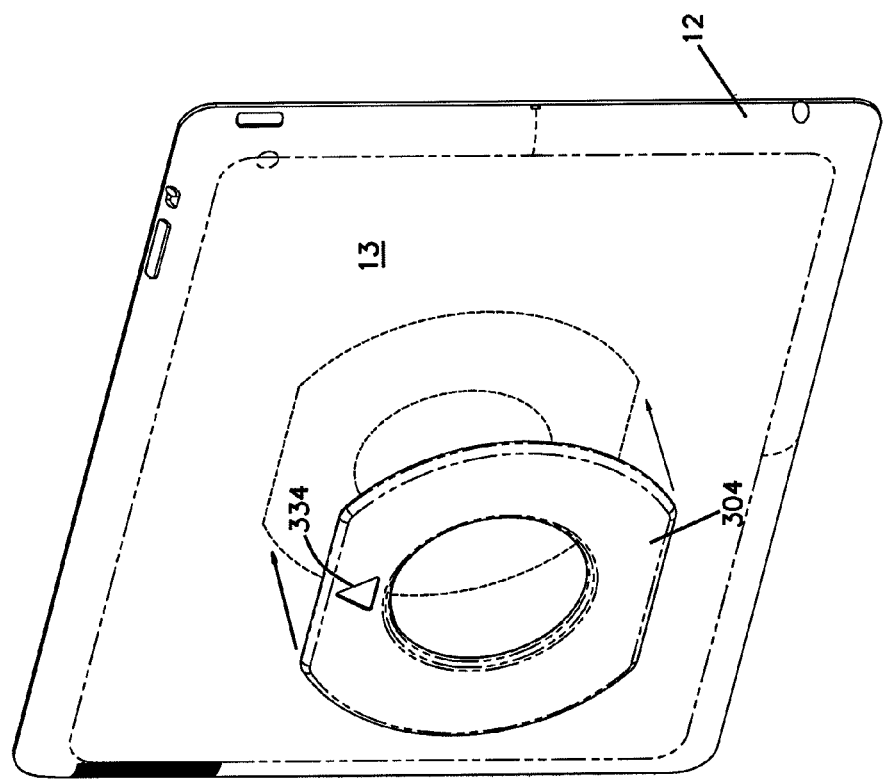
FIG. 30 illustrates the converter structure of the holder system of FIG. 16 being coupled to an electronic device.
Figure 31:
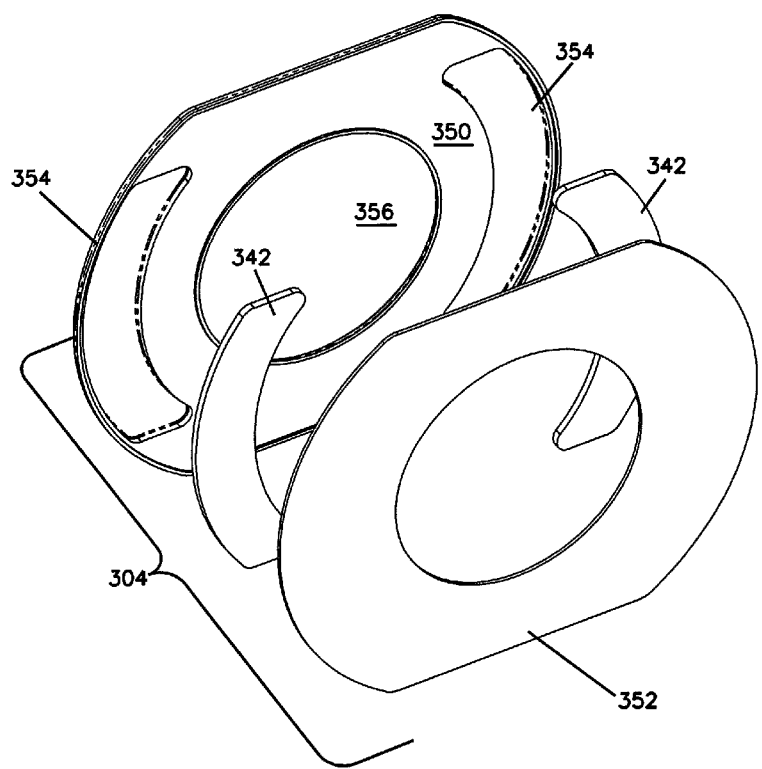
FIG. 31 is an exploded view of the converter of FIG. 30.
Figure 32:
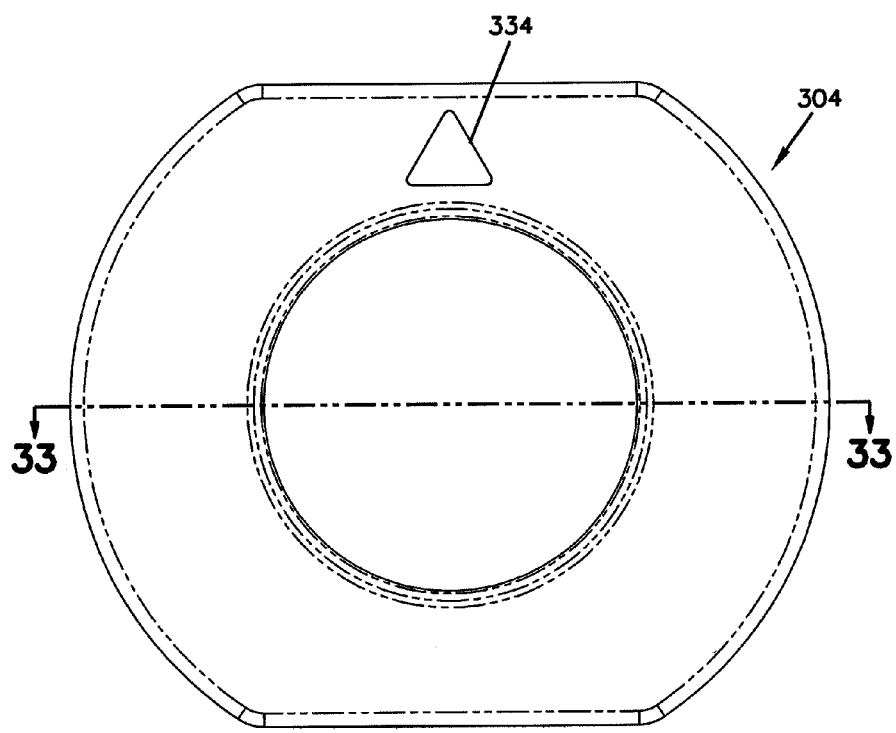
FIG. 32 is a rear view of the converter of FIG. 30.
Figure 33:
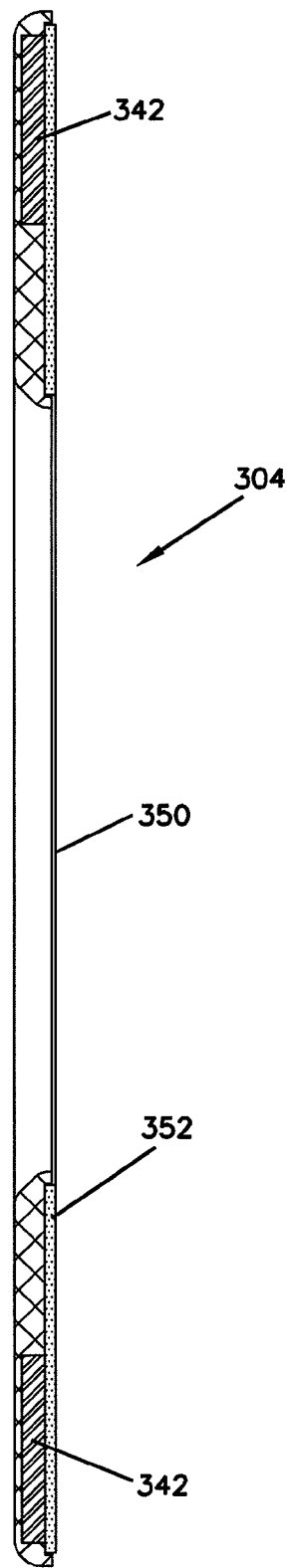
FIG. 33 is a cross-sectional view taken along line 33-33 of FIG. 32.

FIG. 31 illustrates an exploded view showing the converter 304 with its alignment sides 354 and centering circle 356, steel targets 342, and adhesive pad 352. FIG. 30 shows the converter 304 being adhesively secured to the back 13 of an electronic device 12. The converter 304 is aligned with the center of the device 12, wherein its alignment indicator 334 would be positioned at the right-hand side of the device 12 when the device 12 is viewed in the portrait orientation.

Regarding the operation of the holder system 300, FIG. 20 illustrates the attachment between the converter structure 304 and the head 316 of the holder 302, wherein the converter 304 is shown as being adhesively attached to the back 13 of the electronic device 12. In the illustrated example, the head 316 is magnetically attached to the converter structure 304. The cross-section illustrated in FIG. 20 is taken along line 20-20 of FIG. 19, wherein one of the detachment members 330 is shown in an engaged position and one is shown in a release position. As such, in FIG. 20, one of the detachment members 330 is shown with its magnet 328 directly in line with a corresponding steel target 342 within the converter 304. The other detachment member 330 is shown in a release position wherein the majority of the magnetic flux has been weakened such that the attraction forces holding the head 316 to the converter 304 are greatly reduced.

In the depicted embodiment, as shown in FIG. 24, the detachment members 330 include strong neodymium iron boron magnets 328 that are permanently attached to the members 330. And, as illustrated in FIG. 31, the steel targets 342 may be permanently integrated into the converter structure 304 by adhesive, mechanical means, or insert molding.

The magnetic contact force between the head 316 and the converter 304 is greatest when the magnet 328 is in direct contact with its steel target 342, but a thin-film of polymer can reduce the sliding friction and may be desired to cosmetically decorate the converter. The thicker the film of polymer, the lower the magnetic coupling force will be.

In one example embodiment, if each arcuate-shaped magnet 328 has a surface area of about 1.308 square inches at about 0.125" thickness and is magnetized to an N42 strength, the magnet 328 can have a maximum pull force of about 16.94 lbs. against a suitably thick steel target 342. When the magnet 328 is spaced a distance from the steel target 342 with about a 0.020" gap, the magnetic force is reduced to about 71% strength, resulting in about 11.95 lbs. The steel target 342 is also desired to be very thin to have the least impact on the thickness of the converter 304. A steel target 342 of at least about 0.078" provides the maximum magnetic coupling force. Reducing this target thickness to about 0.060" for 16 gauge steel nets only 92% of full force. The total resulting force is then calculated to be 11.95×92%=10.99 lbs. Two magnets 328 therefore can provide almost about 22 lbs. of holding force.

FIG. 22 illustrates a side view of the head 316 and shows the large surface area of the detachment members 330 to allow the operators thumb and fingers to squeeze the detachment members 330. FIG. 23 illustrates the top view of the head 316 and shows the generous spacing available to the user for access for tightening and loosening the threaded ball nut 322. The ball nut 322 is shown with suitable features 323 to allow traction or grip to tighten and loosen the nut. FIG. 25 illustrates the rear view of the head 316 and shows the alignment indicator 334 so that the electronic device 12 may be repeatedly re-attached to the head unit 316.

In FIG. 25, it can also be seen that the detachment members 330 are wedge shaped and fit into the dovetail grooves 338 in the head main body 344. When the magnets 328 are permanently installed using an adhesive 336 such as 3M VHB™, the detachment members 330 are configured such that they cannot be removed, but can only move laterally from an outer mounting position to an inner release position. When the detachment members 330 are moved inwardly with a squeezing motion, the residual magnetic forces allow easy but controlled release of the electronic device 12 from the holder 302.

As noted previously, both of the detachment members 330 are biased outwardly to the steel target plates 342, the biasing forces being provided by the internal springs 332 shown in FIGS. 24 and 26. The detachment members 330 are constrained to lateral sliding motion due to a dovetail type joint between the main body 344 of the head 316 and the detachment members 330, as shown in FIG. 25.

Although the targets 342 provided in the converter structure 304 that are used to attract the magnets 328 provided in the detachment members 330 of the head 316 have been described as being steel, it should be noted that steel is only one example material and other suitable metals may be used.

FIG. 24 illustrates an exploded view showing the components of the head unit 316, especially those features that relate to the rotary joint 326 between the socket 324 and the head 316.

As shown, the ball nut 322 is internally threaded to engage with external threads 360 of the rotary socket 324. Similar to the second and third embodiments of the holder 100, 200, four button or disc magnets 128 are bonded into four rotary socket magnet pockets 362. A slip disk 364 separates the rotary socket 324 from the head main body 344 and reduces friction and provides a controllable gap between the magnets 128. Four magnets 128 are bonded into the head main body 344. A Plastite® or other suitable screw 366 may be used to couple the head main body 344 to the rotary socket 324. A graphic 368 can be applied to the centering face of the head main body 344.

As discussed previously, the ball and socket joint 318 provide for spherical adjustments and rigid connection when the ball nut 322 is tightened. The center screw 366 may be provided to keep the socket 324 axially retained to the head main body 344 while allowing rotational motion therebetween. The screw 366 can be adjusted to provide the desired pre-load for a friction-free yet stable rotary operation.

Figure 28:
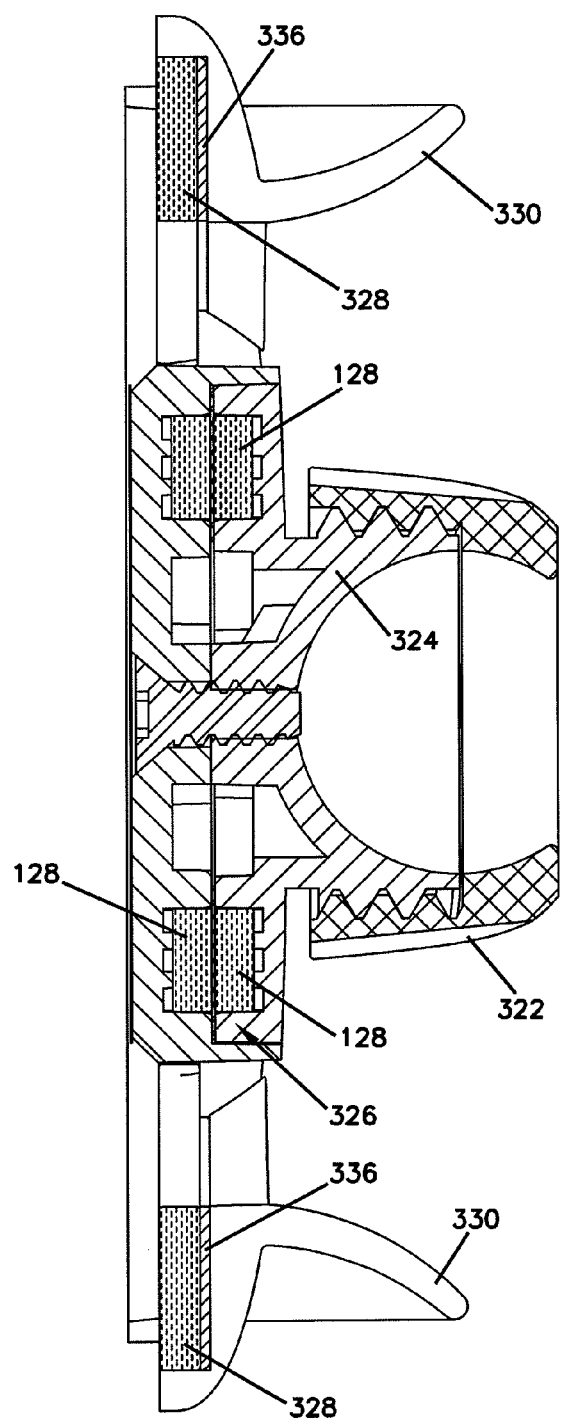
FIG. 28 is a cross-sectional view taken along line 28-28 of FIG. 25.

FIG. 28 illustrates a cross section of the head 316 showing the axially arranged magnets 128. The lower set of magnets 128 are arranged at each of the four quadrants of a circle. Each magnet 128 may be bonded into the head body 344 using epoxy or CA adhesive. Epoxy adhesive is generally preferred and can build a thickness so that a waffle type depressions are provided into the magnet pocket 362. The depressions serve to provide room for the adhesive to fill and also add greater surface area for the epoxy to bond to the head unit 316.

The head 316 of the holder 302 can be molded from ABS plastic, polycarbonate, nylon, or similar non-magnetic materials. Industrial versions can be formed from aluminum as desired. The rotary socket 324 can also be formed from similar materials and is configured to include opposing four magnets 128, one at each quadrant. The magnets 128 strongly attract each other. N42 strength button magnets Ø8 mm×3 mm may have an attracting force of about 2.28 lbs. when spaced about 0.010" apart. Four of these magnet pairs may provide about 9.12 lbs. of force total. The sliding force of these magnet pairs are approximately ½ of the axial force. Therefore, the resulting magnetic holding force against rotary motion is approximately 4.56 lbs. If the magnets 128 are arrayed along a 1.5" circle, their resulting moment arm is 0.75". A typical electronic device can be as wide as about 9.5", or a torque arm of 4.75". Dividing 4.75 into 0.75 yields a mechanical advantage of about 6.33:1. The resulting force necessary to break away the head unit 316 from its normal position is about 0.72 lbs. or 11.5 ounces when gripping the outside edge of the electronic device 12. The holding strength at the quadrants can be adjusted by magnet size and gap choice. A magnet to magnet attracting force has a self-aligning behavior which may eliminate sloppy positioning when compared to a magnet simply being attracted to a metal target. Since there is about a 9.12 lb. axial force inside the rotary joint 326, it might be preferred to have a Teflon™ slip disc 364 to eliminate the slip-stick friction between the magnet faces and head and socket surfaces.

These features noted above may also be applicable to the second and third embodiments of the holder 100, 200 illustrated in FIGS. 11-15.

As will be discussed in further detail below, the rotary joint 326 between the socket and the heat unit may also include 180-degree end stops 106 as provided in previous embodiments (please see FIG. 29).

Figure 27:
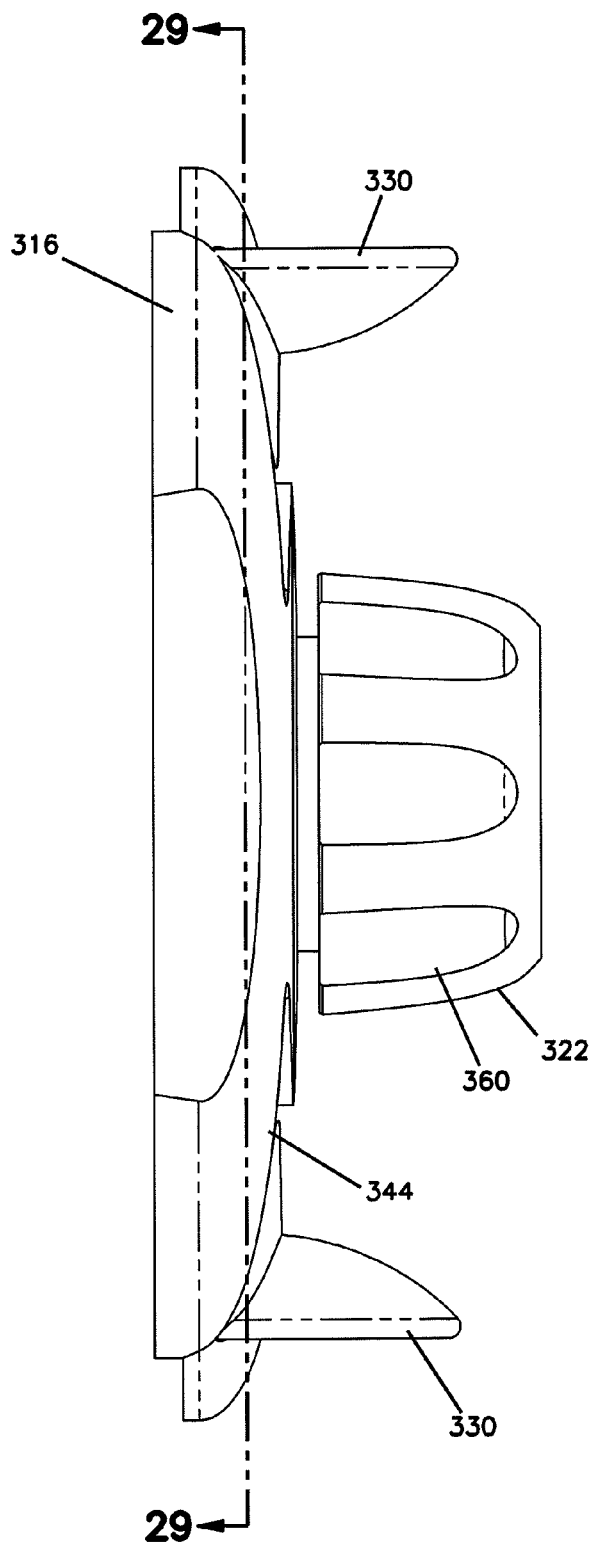
FIG. 27 is a top view of the head portion of FIG. 24.

FIG. 27 illustrates a side view of the head 316 of the holder 302 with a cut-line to show the rotation limit stop 106 for 180 degrees, which is illustrated in FIG. 29.

As in the second and third embodiments of the holder 100, 200, the rotary joint 326 may be provided with end stops 106 for the purpose of using the holder 302 itself as the torque arm to tighten or loosen the threaded nut 322 of the ball and socket connector 318. Without any rotation limits, the nut 322 could be difficult to tighten as the rotary joint 326 might allow the head 316 of the holder 302 to free wheel. The end stops 106 can be provided by tabs 112 that engage opposing surfaces 114. When a user wants to tighten or loosen the ball 320 of the ball and socket connector 318, the end stop 106 can be engaged to provide the needed torque. FIG. 29 illustrates a cross-sectional view of the head 316, depicting how the end stops 106 may be arranged. The rotary socket 324 is shown with the cross hatch pattern and shows the four magnets 128 and four magnet pockets 162 aligned fully counter clockwise against a stop structure 115 molded into the head main body 344 at the 9 o'clock clock position that provides the contact surfaces 114. Rotation of the socket 324 clockwise as indicated by the rotation arrow allows the rotary socket 324 to rotate 180 degrees until the opposite tab 112 hits the stop structure 115.

Although in the foregoing description, terms such as "top", "bottom", "front", "back", "right", "left", "upper", and "lower" may have been used for ease of description and illustration, no restriction is intended by such use of the terms. As discussed previously, the holders/stands and/or the holder systems described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

The invention claimed is:

1. A holder system for an electronic device comprising:
   a converter that is configured to be attached to the electronic device;
   a head that is configured to be releasably attachable to the converter, wherein the head includes at least one movable portion that is configured for releasing the head from the converter;
   a neck for supporting the head relative to a surface; and
   a connector coupling the neck to the head, the connector configured to allow adjustment of the electronic device with respect to the neck about at least one spherical axis of freedom when the electronic device is coupled to the head, the spherical axis of freedom including yaw, pitch, and roll axes:
   wherein the head is configured to be attachable to the converter via magnetic force and the moveable portion of the head is configured to break the magnetic force, wherein the moveable portion is slidable for shearing off the magnetic force.

2. The holder system of claim 1, wherein the converter is coupled to the electronic device and the head is coupled to the electronic device via the converter.

3. The holder system of claim 1, wherein the movable portion includes a magnet that interacts with a metallic element of the converter for detaching the head from the converter.

4. The holder system of claim 1, wherein the movable portion is spring biased to an attachment position and is movable toward a detachment position against the bias of the spring.

5. The holder system of claim 1, wherein the connector includes a ball and socket connector coupling the neck to the head, the ball and socket connector configured to allow adjustment of the yaw, the pitch, and the roll of the electronic device with respect to the neck.

6. The holder system of claim 5, wherein the holder includes a rotary joint that allows further adjustment of the roll of the electronic device without disturbing the yaw and the pitch of the electronic device after the yaw, the pitch, and the roll of the electronic device have been initially adjusted and locked using the ball and socket connector.

7. The holder system of claim 1, wherein the converter is configured to be attached to the electronic device via adhesive.

8. A holder system according to claim 1, wherein the electronic device is a tablet personal computer.

9. A holder system for an electronic device comprising:
   a converter that is configured to be attached to the electronic device;
   a head that is configured to be releasably attachable to the converter, wherein the head includes at least one moveable portion that is configured for releasing the head from the converter; the head is configured to be attachable to the converter via magnetic force and the moveable portion of the head is configured to break the magnetic force, and wherein the moveable portion includes a magnet that interact with a metallic element of the converter for detaching the head from the converter.

10. A holder system for an electronic device comprising:
    a converter that is configured to be attached to the electronic device;
    a head that is configured to be releasably attached to the converter via magnetic force when the head is in line with the converter, and wherein the head is detached from the converter by shearing movement of the head or the converter.

* * * * *